United States Patent
Gross et al.

(10) Patent No.: US 6,782,510 B1
(45) Date of Patent: Aug. 24, 2004

(54) WORD CHECKING TOOL FOR CONTROLLING THE LANGUAGE CONTENT IN DOCUMENTS USING DICTIONARIES WITH MODIFYABLE STATUS FIELDS

(76) Inventors: John N. Gross, 47 Big Tree Way, Woodside, CA (US) 94062; Anthony A. Gross, 320 Auburn Way, #17, San Jose, CA (US) 95129

( * ) Notice: Subject to any disclaimer, the term of this patent is extended or adjusted under 35 U.S.C. 154(b) by 0 days.

(21) Appl. No.: 09/014,414

(22) Filed: Jan. 27, 1998

(51) Int. Cl.$^7$ ................................................ G06F 7/00
(52) U.S. Cl. ..................... 715/533; 715/532; 704/9; 704/10
(58) Field of Search .................... 707/530, 531, 707/532, 533; 704/9–10

(56) References Cited

U.S. PATENT DOCUMENTS

| | | | | |
|---|---|---|---|---|
| 4,456,973 A | | 6/1984 | Carlgren et al. ............... 704/1 |
| 4,674,065 A | | 6/1987 | Lange et al. ................. 382/311 |
| 4,903,206 A | | 2/1990 | Itoh et al. .................... 707/533 |
| 5,258,909 A | | 11/1993 | Damerau et al. ........... 707/533 |
| 5,367,453 A | * | 11/1994 | Capps et al. ................. 707/531 |
| 5,437,036 A | | 7/1995 | Stamps et al. ............... 709/302 |
| 5,576,955 A | * | 11/1996 | Newbold et al. ............ 707/533 |
| 5,604,897 A | | 2/1997 | Travis ......................... 707/533 |
| 5,619,648 A | | 4/1997 | Canale et al. ............... 709/206 |
| 5,623,600 A | | 4/1997 | Ji et al. ....................... 713/201 |
| 5,649,222 A | | 7/1997 | Mogilevsky ................. 707/533 |
| 5,678,041 A | * | 10/1997 | Baker et al. .................... 707/9 |
| 5,678,053 A | | 10/1997 | Anderson ...................... 704/1 |
| 5,696,898 A | * | 12/1997 | Baker et al. ................. 713/201 |
| 5,706,507 A | | 1/1998 | Schloss ....................... 707/104 |
| 5,796,948 A | | 8/1998 | Cohen ......................... 709/206 |
| 5,812,863 A | * | 9/1998 | Ishikawa .................... 715/533 |
| 5,832,212 A | * | 11/1998 | Cragun et al. ............... 713/202 |
| 5,835,722 A | * | 11/1998 | Bradshaw et al. .......... 709/225 |
| 5,848,418 A | * | 12/1998 | De Souza et al. .......... 707/102 |
| 5,884,033 A | | 3/1999 | Duvall et al. ............... 709/206 |
| 5,889,943 A | | 3/1999 | Ji et al. ....................... 713/201 |
| 5,890,182 A | | 3/1999 | Yagisawa et al. ........... 707/535 |
| 5,907,839 A | * | 5/1999 | Roth ............................. 707/5 |
| 5,911,043 A | * | 6/1999 | Duffy et al. ................. 709/203 |
| 5,956,739 A | * | 9/1999 | Golding et al. ............. 715/533 |
| 5,960,080 A | | 9/1999 | Fahlman et al. ............ 380/252 |
| 5,973,683 A | * | 10/1999 | Cragun et al. ............... 345/327 |
| 5,999,896 A | * | 12/1999 | Richardson et al. ........... 704/9 |
| 5,999,932 A | | 12/1999 | Paul ........................... 707/10 |
| 6,023,723 A | | 2/2000 | McCormick et al. ....... 709/206 |
| 6,072,942 A | | 6/2000 | Stockwell et al. .......... 709/206 |
| 6,073,142 A | | 6/2000 | Geiger et al. | |
| 6,092,101 A | | 7/2000 | Birrell et al. ............... 709/206 |
| 6,266,664 B1 | * | 7/2001 | Russell-Falla et al. ......... 707/5 |

OTHER PUBLICATIONS

Schrader, A., In Search of the Perfect Filter: Indexing Theory Implication for Internet Blocking and Rating Software, School of Library and Information Studies University of Alberta, http://www.ualberta.ca/~aschrade/nl_cen2.htm, Jun. 1998.*

Cyber Snoop Release, "Pearl Software Introduces Cyber Snoop Version 2.07," Nov. 3, 1997, pp. 1–2, http://www.pearlsw.com/psnews/cs_rel.htm.

(List continued on next page.)

*Primary Examiner*—Stephen S. Hong
*Assistant Examiner*—Cesar B Paula
(74) *Attorney, Agent, or Firm*—J. Nichols Gross

(57) ABSTRACT

A word processing tool is disclosed for checking the substance and not merely the spelling of words provided by a user. The word checker is capable of identifying potentially inappropriate word choices so that unintentional errors are not introduced into electronic text documents. The word checker can be implemented as a stand-alone procedure, or integrated into a conventional spell-checking program.

85 Claims, 3 Drawing Sheets

OTHER PUBLICATIONS

Learning Company Press Release, "Learning Company's Cyber Patrol® Product Selected by Microsoft Corporation as Exclusive Filtering Technology for Internet Explorer Plus to Protect Children," Oct. 29, 1997, pp. 1-3, http://www.learningco.com/news/news/971029.htm.

Microsystems Press Release, "Microsystems Answers Parents' Demands with Cyber Patrol version 3.0," Jun. 5, 1996, pp. 1-4, http://www.cyberpatrol.com/cyber/patrol/cpnews/pr96/CP3_PR.htm.

AUP Auction Tools Press Release, Jun. 27, 1997, 1 Page, http://www.aupaction.com/pr0627.html.

* cited by examiner

WORD CHECKING TOOL FOR CONTROLLING THE LANGUAGE CONTENT IN DOCUMENTS USING DICTIONARIES WITH MODIFYABLE STATUS FIELDS

FIELD OF THE INVENTION

The present invention relates to authoring tools that can be used in connection with contemporary word processing programs. In particular, the present invention provides an author of an electronically drafted document with a word checker that checks for and identifies inappropriate word choices in such document based on a sensitivity scheme of the user's choosing so that such words may be modified if necessary.

BACKGROUND OF THE INVENTION

The prior art is replete with word processing programs, including a couple of contemporary favorites, Microsoft WORD and Novell's Wordperfect, that are used by a substantial portion of IBM-compatible computer users. These programs are used in known ways for permitting authors to create electronic text (and graphics) documents. As a part of such word processing program, a spell-checking routine is almost always included to help authors reduce the number of unintentional text errors in such documents. A number of prior art patents are directed to this feature, and a reasonable background of the same is described in U.S. Pat. No. 5,604,897 to Travis and U.S. Pat. No. 5,649,222 to Mogilevsky, both of which are hereby incorporated by reference.

It is apparent, however, that spell-checking routines associated with such word processing programs have a number of limitations. Key among these is the fact that they cannot determine whether a particular word choice, while accurately spelled, is nevertheless perhaps inappropriate for the particular context within a particular document. As an example, many words that may be intended by a drafter (such as the words "ask," "suit," "public," etc.) can be transformed into potentially offensive words merely by changing a single letter in such words, transposing a few letters, or by mistakenly adding or dropping a letter. These transformed words, however, will still pass the spell-checking facility, because many of them include even a number of offensive words as part of their standard dictionary. For example, the word "ask" may be inadvertently written as "ass," and unless the message is intended to discuss issues pertaining to certain members of the animal kingdom, it is likely to be an inappropriate word choice. If these inadvertent mistakes are not caught by the drafter during a later review, they will be included in such document and potentially communicated to one or more third parties. Depending on the severity of the mistake, the receiving audience, and the scope of the distribution of the document, the consequences may range from minor embarassment to substantial financial loss from lost future business with such third party.

The possibility of such errors is increasing each day because of a number of driving factors, including the fact that standard dictionaries for word processors are growing in size to accommodate the largest number of words of course in a particular language. While one solution may be to not include such words in an electronic dictionary in the first place, this result makes the creation of such dictionaries more complicated because an initial censoring must be done before the words are even translated into electronic form. Moreover, this solution does not help the user to identify inappropriate words that may be skipped over during a spell-checking routine.

Another factor leading to increase in electronic word choice errors is the fact that many electronic documents are never reduced to a physical form before being disseminated. In many instances a glaring error is caught by a human inspection of a printed page before it is sent out. The so-called "paperless office" while improving efficiency and reducing waste also naturally causes a larger number of inadvertent message errors in text documents. Additional errors can even be induced by spell-checkers because when they detect a mis-spelled word, they will often provide a menu of potential word choices as replacements, and it is remarkably easy to select an inappropriate word choice from such menu, again merely by accident. Such errors of course will not be detected because the document is erroneously considered to be "safe" by many users after spell-checking has completed and they will not check it again. In other words, some facility for checking the spell-checker dynamically is also desirable, but does not exist at this time.

There is some facility in the prior art for permitting users to create so-called "exclusion" dictionaries for analyzing text documents. An example of such kind of system is illustrated in U.S. Pat. No. 5,437,036 to Stamps et. al. which is incorporated by reference herein. A drawback of this approach, however, lies in the fact that it requires the user to both divine and manually input all the potential mis-spellings that could occur, and even if they had the time, there are obviously an endless variety that might never be considered by such user. For example, a user may not have the foresight to notice that a simple transposing of two characters (a common error) may generate a word that is extremely offensive. Furthermore Stamps et. al. do not appear to contemplate the possibility that the act of rendering a document "spelling" error free may itself generate unintended word selection errors. As such, therefore, Stamps et. al. is not truly a "word" checker, but, rather, an enhanced spell checker that has been sensitized to a particular user's poor spelling habits. While it incidentally determines whether a word is perhaps not the intended choice of the author (i.e., that the word does not have a particular meaning), it does not perform the important step of determining the precise meaning of the word, and in particular whether the word also has a potentially inappropriate meaning as well.

A few methods for proof-reading electronic documents are also known in the art. A U.S. Pat. No. 4,674,065 to Lange et. al., also incorporated by reference herein, describes a technique for detecting word context errors in a document. This technique seems limited to homophones however (for example, it knows to see if a user intended to use the word "course" instead of "coarse") and is not generally applicable to the problem of determining inappropriate use of language in documents. For example, unless a particularly offensive word has a homonym, Lange et. al. would not even detect such word as being a problem. The approach of Lange et. al. further requires a fair amount of computational complexity, since it must analyze the text preceeding and following after a word and use a complicates set of syntax rules to determine whether the word is being used in context correctly. This fact alone makes it essentially unusable for most contemporary word processing programs which utilize background spell checking, dynamic spell-checking, etc.

Finally, a U.S. patent by U.S. Pat. No. 4,456,973 to Cargren et al., and also incorporated by reference herein, discusses the use of an electronic word dictionary that has an associated code field for indicating the level of comprehensibility of such word. For example, the word "abandon" is coded with a numerical designation 6, indicating that the word is probably understandable by children at the $6^{th}$ grade level. Cargren et al., however, do not appear to address the more general problem of identifying text that has been inadvertently mis-spelled by an author, and which is likely to be inappropriate. In other words, the Cargren al. approach presumes that the user has correctly input the word in question, and unless the word is coded with a rating below that of the intended grade group of children, it is not flagged in anyway. It is apparent that this method of encoding is fairly impractical for use in an electronic dictionary intended to be used by an adult population, because adults are not classified in this way. In fact, if a target audience of a document is intended to be primarily adults, then the Carlgren et al. approach would not flag any words at all, because they would probably be presumed to be operating at the highest level of education (12), thus rendering this type of filtering essentially useless. In addition, there is no facility mentioned by Cargren et al. for detecting words that are likely to be offensive, even if consciously selected by the author. For example, the use of the word "dame" may be consciously selected but nevertheless undesirable in communications in which the intended audience is primarily adult women. A drafter of an electronic document may desire to be notified of such potentially offensive words if they are known to be sensitive.

SUMMARY OF THE INVENTION

An object of the present invention therefore is to reduce the number of unintentional inappropriate word choices within electronic documents that would otherwise go unnoticed using conventional word processing document checking tools so as to improve the integrity and accuracy of such documents;

Another object of the present invention is to provide a system and method that is easily and seamlessly integratable into conventional word processing document checking tools so as to enhance the performance of such tools;

A related object of the present invention is to provide a system and method for filtering and verifying the contents of one or more electronic documents to determine the presence of potentially inappropriate and unintended word choices;

Yet a further object of the present invention is to reduce the number of intentional but unknowingly inappropriate word choices within electronic documents that would otherwise go unnoticed using conventional word processing document checking tools;

A related object is to improve the performance of present day word processing document checking tools by providing an additional verification tool that confirms the appropriateness of the selections made by such prior art checking tools;

Another object of the present invention is to permit a user of a word processing program to selectively control the level of sensitivity to be used for determining whether words in an electronic document are potentially inappropriate;

Still another object of the present invention is to permit an author of an electronic document to have the words of such document analyzed and processed by a number of context filters of the author's choosing to reduce the number of potential inappropriate words in such document.

These and other objects are achieved by the present invention which includes a word checking software routine (implementable as a stand-alone program or integrated with a conventional spell checker) that checks the meaning of words in an electronic document authored by a user. When word-checking for the document is desired by the user, the words from the document are retrieved one at time, and checked against entries in an electronic dictionary to determine whether they have a particular meaning that has been designated as potentially inappropriate for use in a text document. The determination is made based on comparing a threshold sensitivity level (which can be controlled by the user) with an appropriateness rating found in one or more status fields associated with the word. If the word in question has a rating higher than the threshold set by the user, an alert is provided to indicate such result.

In another embodiment, multiple status fields are used. The status fields can be used essentially as multiple context filters for assisting an author in reducing the number of potentially inappropriate words as they may be conveyed to multiple intended audiences. The ratings for the words in any of the status fields can have any range of values and are preferably coded at the time the words are placed into the electronic dictionary. They can also be modified by the user, later, if desired.

The present invention is completely integratable with a conventional spell-checking program, so that the spelling of a word can also be analyzed before its meaning is also checked. When a mis-spelled word is found, a user can select from a list of accurately spelled substitute words instead, but such substitute word is also checked to see if has a meaning that is potentially inappropriate for use in a text document.

Another variation of the present invention permits a user to specify a set of documents to word-check, and to generate an output indicating the results of such check.

In yet another embodiment, the meaning of the words in the document are checked during an idle state of the word processing program, so that the operation of checking the entire document at the user's request at a later time can be reduced in time because it will already have been partially completed.

To further reduce errors, another embodiment of the present invention checks the meanings of words substantially immediate in time after they are input into the document by the user. This can ensure that a potential word problem is in fact brought to the user's attention automatically and without the need for a further command from the user.

The electronic dictionary used in the present invention includes a series of records corresponding to words and their associated status field values. The data for these records are input in electronic form to create a set of words in computer readable form for the dictionary, along with status fields associated for each of such words. Again, as mentioned above, the status fields indicate whether such word has a meaning that is potentially inappropriate for use in a particular context. As the dictionary is constituted, any number of status fields can be used to correspond to different sensitivity ratings for different target audiences.

The present invention can be included within a word checking software module that is itself embodied and transferred in computer readable form, such as a floppy disk, a hard disk, a CD-ROM, a magnetic tape, or a non-volatile semiconductor memory. In this way, a new type of computer system is effectuated which permits an author to perform a word checking operation on an electronic text document generated by a conventional word processing program running on such system.

DETAILED DESCRIPTION OF THE INVENTION

Figure 1:
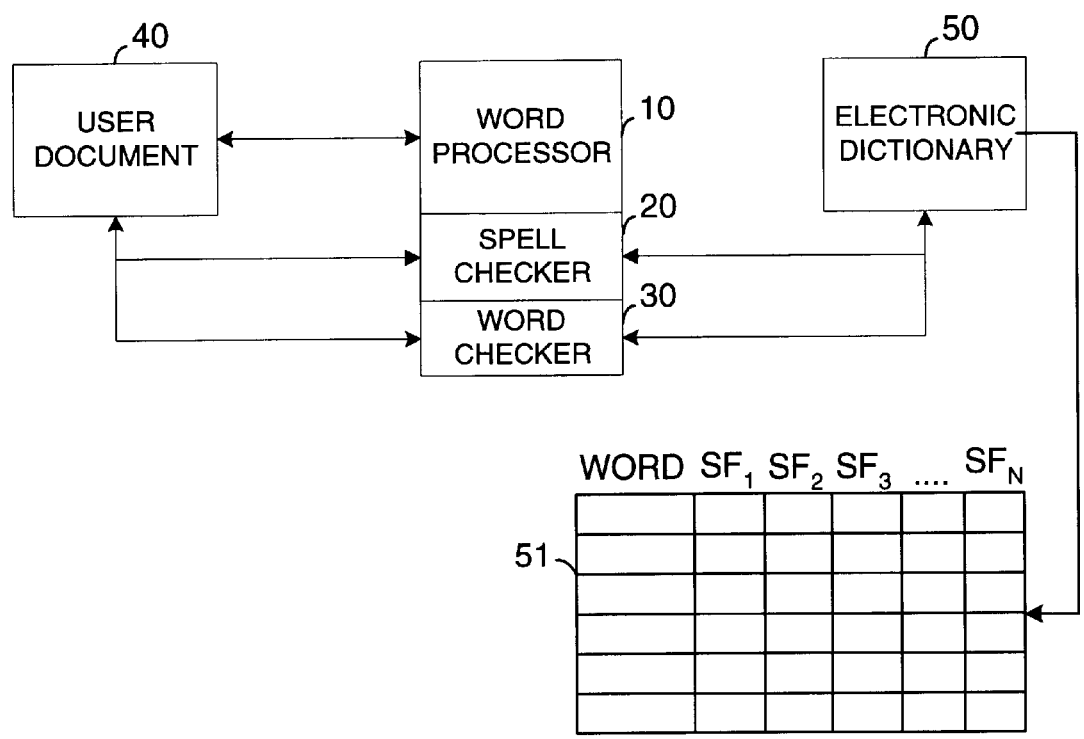
FIG. 1 is a simplified block diagram of a word processing system embodying the teachings of the present invention.

FIG. 1 illustrates a physical implementation of a preferred embodiment of a system employing the present invention. A user can interact with a word processing program 10 loaded in a system memory of a conventional computing system, such as a personal computer. Such programs typically include a spell checking routine or module 20, broken out visually in the present figure for clarification. The inventive routine of the present invention is also illustrated as word checker routine or module 30.

Both spell checking routine 20 and word checker routine 30 have access to and can store/retrieve entries from a standard electronic dictionary 40, which, again, is well-known in the art. It is understood, of course that spell checking routine 20 and word checker routine 30 may be embedded as one software module of program 10, or alternatively, may be constituted as separate programs that interacts with program 10 and each other. Those skilled in the art will appreciate that a number of separate modules (i.e., for controlling printing, document loading, etc.) of program 20 are not shown, but they are not material to the teachings of the present invention. A document 40 is also shown, and this item can be generated and controlled by a user using word processing program 10 in a conventional manner well-known in the art.

Again, while the present illustration depicts the various routines, documents and dictionaries as separate entities, it is understood that this is a simplified description intended to convey the key concepts of the present invention. During normal operation of word processing program 20 these various entities are typically loaded from a non-volatile memory storage device (such as a magnetic hard disk) and then coexist in a physical and logical sense within the same system memory.

Figure 2:
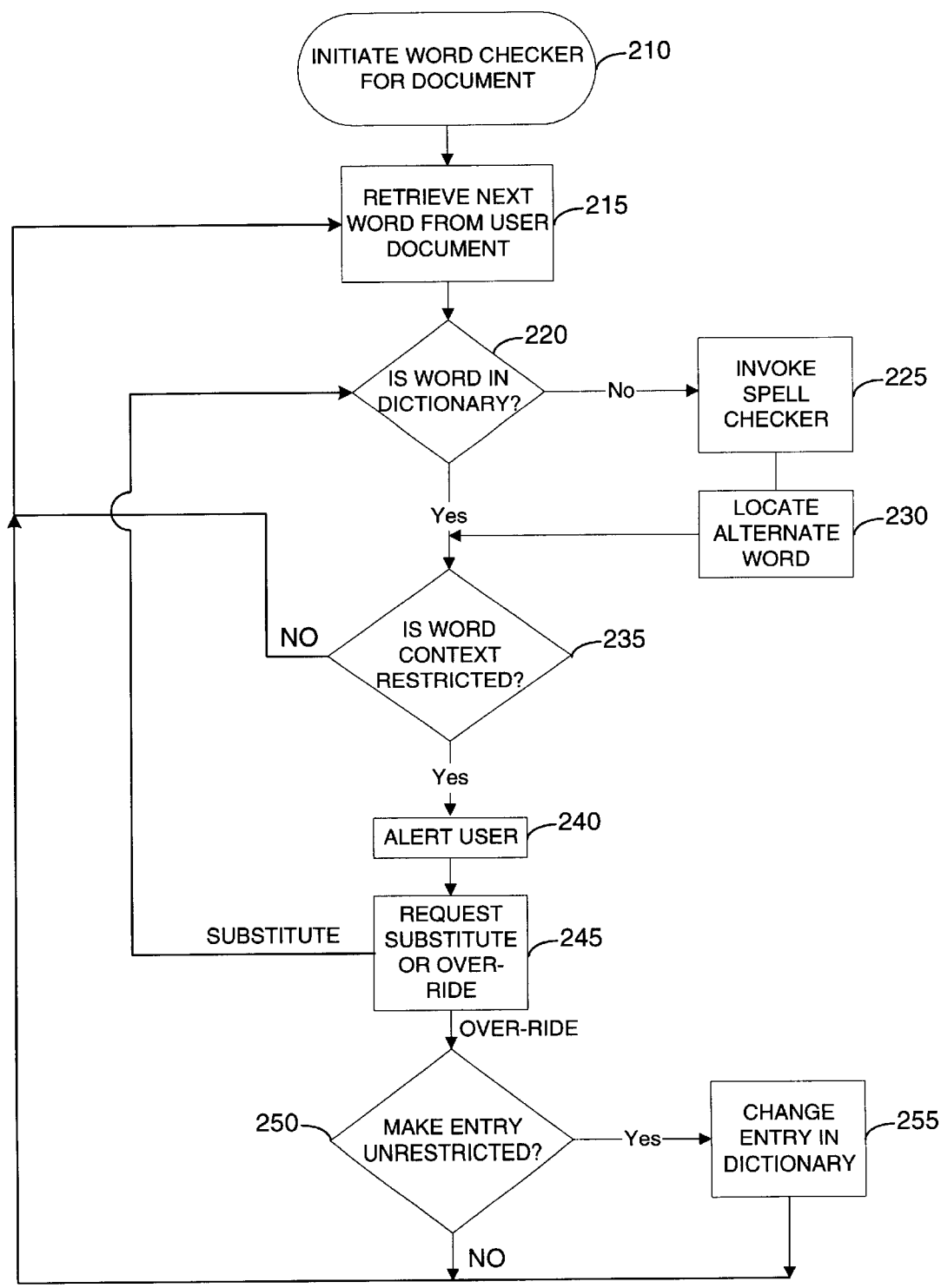
FIG. 2 is a flow chart illustrating the operation of a document word checking tool implemented in accordance with the teachings of the present invention.

A flowchart of the operation of a preferred embodiment of the present invention is depicted in FIG. 2. When word checker routine 30 is invoked at step 210, it begins to retrieve and analyse words from document 10 in a manner well-known in the art from similar techniques used in conventional spell-checkers. In one variation spell checker routine 20 and word checker routine 30 are "integrated" in the sense that they are invoked together and inter-operate with each other. In this variation, the word from the document is first spell-checked in the manner known in the prior art. For example, if the word is not found in electronic dictionary 50 at step 220, spell checker routine 20 is invoked at 225. Again, using conventional techniques, a set of suitable alternative words are presented to a user at step 230 as replacements for the unidentified word.

At this point the method of the present invention is not different in any material fashion from prior art spelling programs. At step 235, however, a substantial difference is found in the fact that the present invention does not blindly permit the user to select one of the alternatives presented at step 230. As mentioned above, there is a non-insignificant chance of error presented when large lists of words are presented to users during spell-checking routines. It is altogether too easy to select the wrong word, and worse yet, a very inappropriate word. For this reason, at step 235, the word selected by the user is also checked to see if it is flagged as potentially context restricted. In this manner, errors are further reduced, and an additional level of accuracy is achieved.

In one implementation the information concerning a rating of the restricted status for the word can be stored in an electronic field associated with a record for such word in a dictionary database, as shown in the breakout of the diagram for dictionary 50. Each entry 51 in dictionary 50 includes a word and one or more associated status fields ($SF_1$, $SF_2$... $SF_n$), which, in its simplest form, can be a single bit field that is either set or not set, depending on whether the word has been previously designated as potentially inappropriate. This status bit can be set either during the creation of dictionary 40, or at the request of a user later on, much in the same way new words can be added to auxiliary or supplemental dictionaries used in conventional spell-checking programs.

In another embodiment, status field $SF_1$ can be allocated sufficient coding bits so that it may have any one of N possible values, where N represents a rating indicating a relative ranking of inappropriateness. This feature allows a degree of grading the words of a vocabulary in shades of grey so to speak, and permits more precise control by the user of the level of inappropriateness that can be tolerated within any particular document. For example, using a scale from 1–10, words that are known and commonly used in a vulgar or offensive fashion can be given a 10 value rating, while words that are commonly understood in only harmless contexts can be given a 1 rating. Other words that are not as fixed in meaning or easily classifiable can be given value ratings in between this range, again, depending on their common usage within a particular target audience. Associated status fields $SF_1$, $SF_2$, etc., can be used to generate different and unique sets of inappropriate words for different intended recipient groups. While only three status fields are shown to simplify the present discussion, it is understood that any number may be used in connection with an electronic dictionary. For instance, the ratings found in field $SF_1$ can be based on word meanings for a typical U.S. based English speaking audience, while $SF_2$ might be used to indicate the rating for the same word for a different target audience (i.e., a different language speaking group, a different geographic group within the same country, or an audience with specific sensitivities to certain types of words). The ratings for status fields $SF_1$, $SF_2$, $SF_3$ may be derived from survey results, from polling the intended audience populations, from analyzing other published literature materials for such intended groups, from organizations specializing in advertising and marketing, etc.

One advantage of the present invention over the prior art lies in the fact that the ratings of dictionary words 41 can be pre-programmed, instead of requiring a user to inspect each entry and designate the status manually. It is expected that such ratings could be generated by persons skilled in the art of contemporary language usage, or persons having particular knowledge or understanding of terminology used in specific fields, or by specific target audience groups, using some of the reference materials (e.g. surveys and the like) described immediately above. The words and associated ratings can be put into computer readable form at the time of the creation of the dictionary by the vendor of word processing program 10, or by a supplier of dictionary 50 using a conventional database structure with accessible records or the like.

It is equally feasible, of course, that an entirely separate electronic dictionary 50' may be designated instead for potentially context restricted words. In this kind of approach step 235 merely checks such separate dictionary 50' to see if the word has been included in the class of potentially inappropriate words. In any event, a number of implementations may be employed for designating potentially offensive words and the present invention is not limited to any of the examples shown herein.

In the event the present invention is not embodied in a routine that runs concurrently with 4spell checker routine 20, it is apparent that steps 220, 235 and 230 would not occur. In other words, in a stand-alone implementation where word checker routine 30 is invoked as another typical word processing tool within document 40, the present routine progresses directly from step 215 to step 235 where the word is checked. The key aspect of the present invention lies in the fact that the meaning or substance of words, not simply the spelling of such words, are determined and verified. In a preferred embodiment, a user of word processing program 10 is able to control both: (1) the range of status fields $SF_1$, $SF_2$, etc. to be checked, as well as (2) a threshold level value for such field that should be used in determining whether a particular word should be flagged. These control mechanisms for the user can take the form of menu choices implemented in well-known fashion in typical contemporary spell-checking programs. In this manner, a particular user document 40 can be subjected to a variety of language "filters" and with varying levels of sensitivity to provide additional functionality and benefits. For example, some U.S. companies doing business in foreign countries nevertheless communicate and advertise in English to the local population, because of the ever increasing English fluency of such countries. Documents intended for such audiences can be subjected to filtering not only for English words that are deemed inappropriate by U.S. citizens, but also which have a negative meaning when transliterated into the language of the country in question. Other users may find it useful to designate one status field simply as a filter for those words that they know are prone to over-use or misuse to increase their writing clarity and proficiency. Accordingly, a user of program 10 can decide to utilize any one or more of such filters in connection with the word checking of document 40, and the selection of such filters can be accomplished in any one of several known ways (i.e., highlighting desired filters presented in the form of a list, specifying them by name, etc.) In addition, the user can also determine (if desired) the threshold level of sensitivity to be used during the checking of words in document 40. In other words, when a particular status field $SF_1$ can have a value ranging from 1 to 10, the user can specifically indicate that only words having a status field value in excess of 8 should be considered as potentially inappropriate.

In one sense, the present invention behaves as a superior spell-checker, because it catches even correctly spelled words that are nonetheless incorrect (from the user's intent perspective) because they are based on other words inadvertently mis-spelled originally by the user. In other words, the user had a word with spelling "xyzzy" in mind, but this word was inadvertently input as "xyyzy." If "xyyzy" (the transformed embodiment of "xyzzy") is nevertheless a word in a spell-checking dictionary, the prior art techniques will never detect this mistake as a true error, even though it is undesirable from the user's perspective, and perhaps worse, may lead to significant embarrassment if undetected. By permitting a user to designate sets of words that should be screened (even if correctly spelled) the present invention affords a significantly higher level of confidence to the user that documents will be generated error and embarrassment free. This kind of tool is especially helpful because of the fact that electronic communications occur in rapid fashion, and dissemination of electronic documents can take place with little chance or opportunity for correcting mistakes.

In any event, should a match occur for the word in question indicating that it falls within the parameters of the user's specification for what should be flagged as an inappropriate word, an alert is given to the user at step 240. The alert can take the form of highlighting the word in the text of the document with an accompanying warning that can be either visual, audible or both. The alert can also indicate the identity of the filter that was triggered by the word when more than one status field is used during the word checking process. Again, the precise implementation of the warning is not critical, and any one of many known methods in the art can be used.

At this point, the user can decide at step 245 whether the word is truly inappropriate, and if so, the user can provide a substitute word, or override the program to keep the word as is. The substitute word can be provided directly by the user, or a set of suitable alternatives can be presented in the same way conventional spell checking program 20 provides users with such lists. Again, this substitute selection is nevertheless also inspected and verified for its appopriateness by virtue of the fact that the routine branches back to step 220. In this manner, the potential for erroneous inclusion of offensive or inappropriate language is further minimized.

In the event the user decides to stick with the word, an option can be presented to the user at step 250 for reducing the value of the status field for the word so that it will not be identified as a potentially inappropriate word during a subsequent check (unless a lower threshold is used of course). This might be desirable, for example, in certain fields of use where ostensibly inappropriate words may be nevertheless otherwise acceptable for use in common communications. At step 255, therefore, a user can modify the status of the word in dictionary 50 or 50' as the case may be.

Those skilled in the art will appreciate that the present invention can be used in a number of environments where documents are electronically drafted and have electronic text, including with spreadsheet programs, database programs, e-mail programs, etc. Many of these programs have spell-checking capabilities built in, and the present invention can piggy-back directly on such capability.

Figure 3:
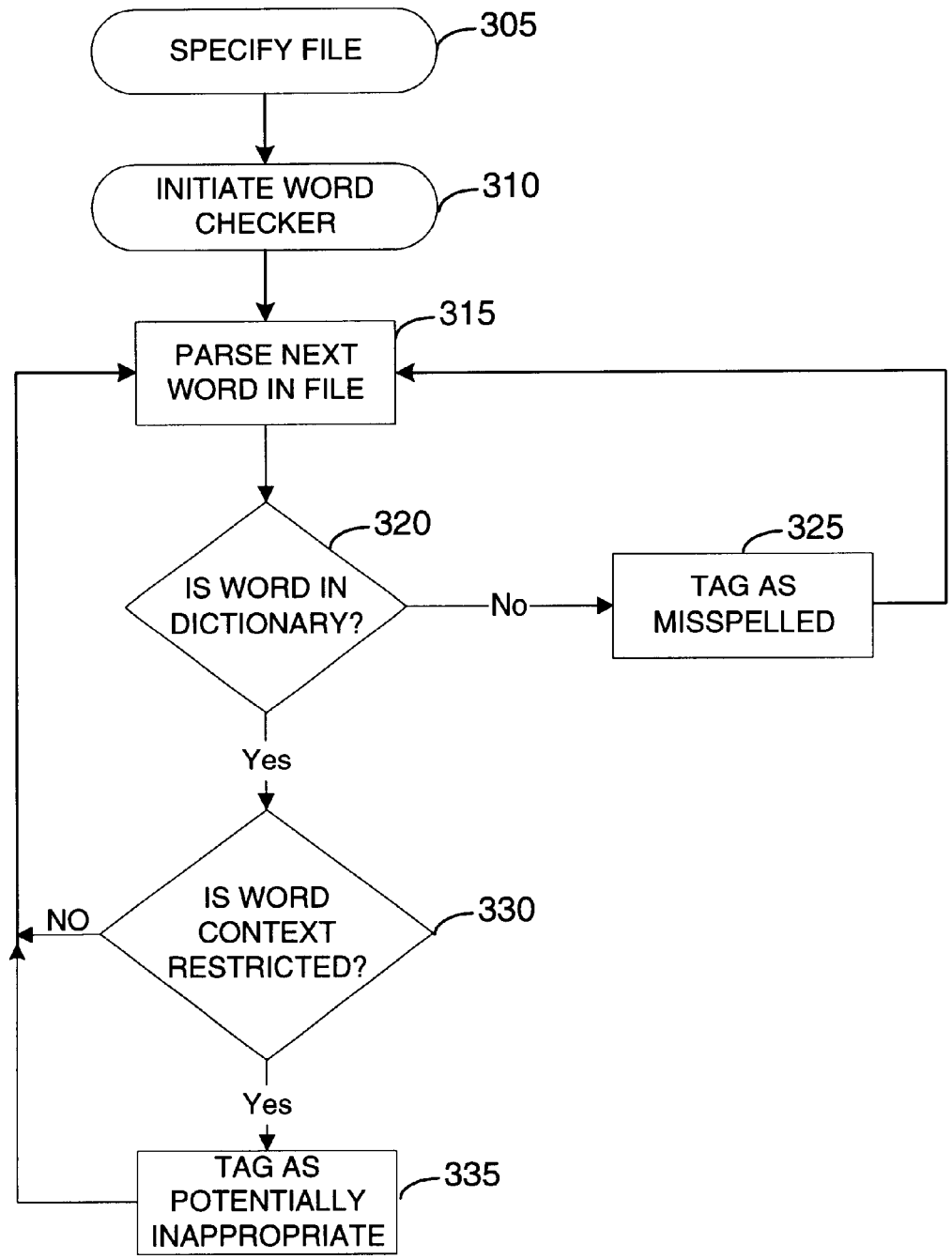
FIG. 3 is a flow chart illustrating a variation of the present invention adapted for checking words in a number of electronic documents specified by a user.

Moreover the present invention can be used for batch inspection and verification of electronic documents, as shown in FIG. 3. Instead of working directly with an open document 40, for example, an electronic file to be word checked can instead be specified at step 305 by a user. This type of capability is common in word-processing programs 10 today, and permits a user to select a number of files that are to undergo a particular operation without opening them. For example, from the FILE OPEN pulldown option in WORDPERFECT, a print operation can be effectuated on a user specified list of files. In this same way, the present invention as embodied in a word checker routine 30 can operate on a number of files at shown at step 310. As each word is parsed at step 315, an optional spell checking routine 320 first determines if there is mis-spelling of such word, and, if so, tags the word as such at step 325. If the word is otherwise identifiable because it is in dictionary 40 or alternate dictionary 40', it is context checked at step 330 in the manner described above and with the same degree of available control by the user. Each word identified as potentially inappropriate is flagged and tagged at step 335 before the routine returns to process the next word. At the end of the file word checking operation, a list of mis-spelled words and identified potentially misappropriate words is generated for the user's review. This list can be displayed visually, generated as a text file, etc. so the user can determine whether there are potential problems in disseminating such electronic files, and, take corrective action if necessary.

It will be apparent to those skilled in the art that the present invention can be implemented using any one of many known programming languages such as C, C++, Pascal, etc. The details of the specific implementation of the present word checker will vary depending on the programming language used to embody the above principles. Furthermore, while the present discussion has revolved around IBM compatible machines it is equally clear that the present invention is not limited to such environments and can be used with Apple compatible machines, or for that matter with any machine that includes a word processor, including personal digital assistants and similar portable computing devices.

Yet another variation of the present invention makes use of a concept disclosed in the Mogilevsky reference discussed above. In this manifestation, spell checking routine 20 and word checker routine 30 (whether integrated or standalone) can be implemented in a well-known fashion that improves performance by having them operate while there is no interaction going on between the user and word processing program 10. In other words, the routine can take advantage of otherwise idle time by checking the document and other open documents if the user is not actively engaged in an operation requiring immediate attention by word processing program 20. It is apparent that such variations of the present invention could be beneficial in a number of environments.

Another useful variation of the present invention can be implemented to take advantage of another well-known concept in the art, and that is the use of "dynamic" text checking. For example, the Travis reference above explains how words can be spell-checked on the fly, i.e., as the user is typing in many conventional word processing programs. This feature permits a user to enter a word, and then have it checked while he or she is still typing, and while their attention is still focused on the document. The spell checking routine 20 automatically substitutes the closest choice it finds for commonly misspelled words; for example, the type word "teh" is changed rapidly to "the" while the user is perhaps still entering text. In a similar vein, a dynamic word-checking feature can be implemented, and it will be apparent to those skilled in the art that this approach is merely a variation of the procedure described in FIG. 2, except that the words retrieved at step 215, are fetched in a background task which is running even while the user is engaged in normal text entry, editing, etc. From the user's perspective, the word-checker routine 30 merely appears as an add-on verification tool feature to spell-checker 20, with additional functionality and benefits for reducing document errors. To minimize errors, the result of the word-check is communicated as quickly as possible to the user, subject to system performance limitations of course. In any event, with typical computing devices it is expected that such result can be communicated before the user has finished completing data entry of another word that must be checked as well. In some application environments it may be desirable to disable further data input once it has been determined that a potentially inappropriate word has just been entered.

One environment where the dynamic variation is especially useful is in e-mail systems where people rarely spell-check a text message after it is composed. Accordingly, the ability to identify and alert users automatically of potential errors is particularly helpful in this area.

In a general sense the present invention can be seen as a useful tool for not only reducing unintentional errors in electronic text documents, but also some intentional errors that are not necessarily understood or appreciated by the user of a word processing program 20. In other words, a word input by a user may be classified by in an number of ways including: (1) an intentional selection that is appropriate; (2) an intentional selection that is inappropriate; (3) an unintentional selection that is inappropriate; or (4) an unintentional selection that is appropriate (in the sense that it is perhaps non-offensive even if it is inapposite for the context). Of these classifications, it is clear that the first category (1) do not require any remedial action. It is equally clear that the category (4) mistakes are perhaps undesirable, but are not easily identifiable, and the computational complexity involved in doing so may not be worthwhile. For example, a sentence that reads "I gave my him jacket" instead of "I gave him my jacket" is not accurate but is not offensive.

The present invention, however, is a simple, fast and cost-effective tool that can be used to easily identify the category (2) and (3) errors above. For the category (3) items, it is a rather simple matter as described above to identify and classify entries in an electronic dictionary with varying status field values reflecting their common usage in a particular context. Any number of potentially offensive, crude, vulgar, obscene or inappropriate words are included in an electronic dictionary for the sake of completeness (and for ease of integration from text to electronic form) but it is rarely the case that they are desired to be used in communication and they can be identified by setting the associated status field to a high value. The category (2) items are somewhat more subtle, but it is apparent that some words, even if consciously selected, may nevertheless be inappropriate because of a number of cultural considerations, or simply because they are generally misused by the general population of authors. As an example, a considerable amount of attention has been focussed recently in the U.S. on eliminating gender specific vocabulary except where absolutely necessary. A business entity attempting to sell products or services to a primarily female based clientele may benefit from a word checking tool that is sensitive to potential gender issues raised by language found in documents intended to be communicated to such clientele to reduce the possibility of an miscommunication. Many ethnic groups have particular words or phrases that are considered inappropriate or offensive by them, even if they otherwise understood as inoffensive by other groups. For example, Chevrolet automobiles designated "NOVA" did not sell well in Latin American countries, because the term as translated into Spanish means "does not go." In addition, many foreigners attempting to write in English often confuse homonyms and substitute the wrong word choice (for example, weather and whether). Similar examples from other fields will be apparent to those skilled in the art. For any such areas, it would be an easy task for a person skilled in the field of contemporary language and familiar with such potentially offensive vocabulary in such specific area to flag such entries in electronic dictionary 50 by using one of the associated status fields ($SF_1$, $SF_2$, $SF_n$, etc.), and/or to assemble and create a separate customized electronic dictionary of words that potentially implicate inappropriate language for a particular audience. These dictionaries could supplement traditional electronic dictionary 50 and be invoked as needed by a user of word processing program 10, so that any one or more of a number of word checking verifications or document filtrations could be performed depending on the target audience intended to recieve such document. Such additional dictionaries, or additional status field values for a particular filter, could be created in a number of ways, including as additional incorporations in the original dictionary 50, or by the vendor or user of computer program 10 modifying dictionary 50 at a later time.

Finally, word processing program 10, spell-checking program 20 and word-checking program 30 described above can be embodied in well-known ways in an article of manufacture such as in traditional computer-readable media commonly used to transport such programs. These can include a floppy disk, tape, hard disk, CD-ROM or equivalent non-volatile storage system. In this format, they can be transported easily and loaded via a host computer into system memory for execution. Alternatively in smaller, self-contained environments, such as personal digital assistants, the above routines can be implemented as part of a non-volatile storage portion of a stand-alone integrated circuit, or embedded as part of a non-volatile storage structure in an architecture of a typical microprocessor or RISC processor. The instructions for carrying out such routines can be encoded or implemented in a silicon substrate as is done with other program ROMs, and using conventional manufacturing techniques.

Although the present invention has been described in terms of a preferred embodiment, it will be apparent to those skilled in the art that many alterations and modifications may be made to such embodiments without departing from the teachings of the present invention. Accordingly, it is intended that the all such alterations and modifications be included within the scope and spirit of the invention as defined by the appended claims.

What is claimed is:

1. An article of manufacture comprising:
   an electronic dictionary including a set of words and a plurality of associated status fields for said set of words, each status field identifying an appropriateness rating for a corresponding audience for individual words in said set of words, such that an individual word can have a plurality of corresponding appropriateness ratings;
   a word checking routine executable by a computing device and for checking whether words in text of an unpublished electronic document should be included in a communication to a particular audience, and which routine is configured to perform the following operations:
   (a) retrieving a word to be word checked from an electronic file containing said text of said unpublished electronic document, and
   (b) accessing the electronic dictionary to determine whether an appropriateness rating of said word identified in a status field for said particular audience exceeds a threshold value specified for such unpublished electronic document; and
   (c) controlling an initial dissemination of such unpublished electronic document based on checking said word;
   (d) repeating steps (a) through (c) with said word checking routine for other unpublished electronic documents in accordance with said plurality of associated status fields to analyze text intended for other corresponding audiences on a document by document basis; wherein the electronic dictionary and word checking routine are embodied in a computer readable media;
   wherein said word checking routine is also configured to permit a user of such routine to change said appropriateness rating value of a status field for words in said electronic dictionary.

2. The article of claim 1, further including a spell checking routine for determining whether said word has been spelled correctly.

3. The article of claim 2, wherein said spell checking routine also presents a first list of alternative words as replacements for said word when it is misspelled, and permits a first replacement word to be substituted for said word.

4. The article of claim 3, wherein said word checking routine is also configured to determine whether said first replacement word has an appropriateness rating that exceeds said threshold value for such unpublished electronic document.

5. The article of claim 1, wherein said word checking routine is also configured to check words substantially immediate in time after they are input into said electronic document by a user, and to allow said user to correct or ignore any words that exceed said appropriateness rating value.

6. The article of claim 1, wherein said computer readable media includes any of the following: a floppy disk, a hard disk, a CD-ROM, a magnetic tape, or a non-volatile semiconductor memory.

7. A system for permitting a user to check the meaning of words in an electronic document, said system including:
   a computer readable storage structure for storing a word checking software module, such module being incorporated as part of a word processing program that can be executed by a computer processing device;
   wherein the word checking software module is configured such that when it is executed by the computer processing device it can perform the following operations:
   (i) retrieving said words to be checked from an electronic file for the electronic docum
   (ii) determining whether any particular word is inadvertentiy included and has a particular meaning that has been designated as potentially inappropriate use in said document, based on the identity of an intended recipient; and
   (iii) alerting a user to the presence of said particular word when it is designated as poten
   (iv) allowing a user to modify said particular word in said document when it is designated as potentially inappropriate before transmitting said document to a third party; and
   (v) allowing a user of said word checking software module to specify a threshold level of sensitivity to be used in determining whether a word in the electronic document is potentially inappropriate;
   further including an electronic dictionary for storing said words, and wherein said word checking software module designates words that have a meaning that is potentially inappropriate by changing said rating value in a status field for such words and/or by storing potentially inappropriate words in one or more separate dictionaries.

8. The system of claim 7, wherein said status field for each of said words can have one of N rating values, where N>2.

9. The system of claim 7, wherein said word checking software module is configured such that it can perform the additional operation of verifying the spelling of said words.

10. The system of claim 9, wherein said word checking software module is configured such that it can perform the additional operation of generating a list of substitute words in the event such word is misspelled, and if a one of the substitute words is selected in lieu of such word, determining whether the substituted word has a meaning that is potentially inappropriate for use in said document.

11. The system of claim 7, wherein said word checking software module is configured such that it can perform the additional operation of checking all text contained in a set of documents stored as files on a computer system, and generating a list of potentially inappropriate words in such documents.

12. The system of claim 7, wherein said word checking software module is further configured to check words substantially immediate in time after they are input into said document by a user.

13. The system of claim 7, wherein said particular word has a first meaning in a first context identified as a first rating in a first electronic dictionary file, and a second meaning in a second context identified as a second rating in a second electronic dictionary file, and wherein said word checking software module is configured such that it can perform the additional operation of determining whether said particular word has a particular meaning that has been designated as potentially inappropriate for use in either of the first or second contexts by examining said first and second ratings.

14. The system of claim 7, wherein said threshold level of sensitivity is a numerical value which a particular word rating value must exceed in order for said particular word to be identified as potentially inappropriate.

15. A method of controlling language content of an electronic document, the method comprising the steps of:
   (a) defining a word as offensive by specifying a first rating value for a first status field associated with said word in an electronic dictionary; and
   (b) defining a word as potentially inappropriate for communication with an intended recipient of the electronic document by specifying a second rating value for a second status field associated with said word in said electronic dictionary, said second rating value being based in part on a consideration of a gender, language use and/or ethnicity of said particular recipient; and
   (c) entering language content for the electronic document to generate an electronic file including a plurality of text words associated with the electronic document; and
   (d) selecting whether said first status field and/or said second status field in said electronic dictionary should be used for examining said plurality of text words; and wherein said selection can be varied for the electronic document depending on an identity of said particular recipient;
   (e) reviewing each text word from said plurality of text words in'said electronic file in accordance with step (d) to determine if any context restricted words are contained in the electronic document, said context restricted words including text words that are offensive and/or potentially inappropriate as defined in steps (a) and (b); and
   (f) identifying any context restricted words in the electronic document before said electronic file is transmitted to said intended recipient so that said context restricted words can be modified or eliminated.

16. The method of claim 15 wherein steps (a) and (b) are controllable by an author of the electronic document to customize a set of offensive and/or potentially inappropriate words.

17. The method of claim 15 further including a step (b)': defining a word as potentially inappropriate for communication with a second intended recipient of the electronic document by specifying a third rating value for a third status field associated with said word in said electronic dictionary, said third rating value being based on a consideration of a gender, language use and/or ethnicity of said second intended recipient.

18. A system for checking the word content of an unpublished
   electronic document, the system including:
   a computer readable storage structure for storing a word checking software module that
   can be executed by a computer processing device;
   an electronic dictionary for storing dictionary words that can be used in the electronic document, said electronic dictionary being set up such that one or more status fields can be associated with such dictionary words, said status fields containing a rating for an offensiveness and/or inappropriateness of such dictionary word for a corresponding audience; wherein the word checking software module is configured such that when it is executed by the computer processing device it can perform the following operations:
   (i) selecting one or more language filters including at least one non-English language filter by changing a value of said one or more status fields for said electronic dictionary words for checking words in an electronic file for the document;
   (ii) using said one or more language filters to check words in said electronic file against corresponding dictionary words by examining said rating in said status field(s);
   (iii) generating an alert when said one or more language filters detects a word that has a corresponding audience;
   wherein publication of electronic documents can be controlled on an individual electronic document basis so that when disseminated an electronic document only includes words that do not have a rating that indicates that such word is offensive and/or inappropriate for a corresponding audience.

19. A system for checking the word content of an unpublished electronic document, the system including:
   a computer readable storage structure for storing a word checking software module that can be executed by a computer processing device;
   an electronic dictionary for storing dictionary words that can be used in the electronic document, said electronic dictionary being set up such that one or more status fields can be associated with such dictionary words, said status fields containing a rating for an offensiveness and/or inappropriateness of such dictionary word for a corresponding audience;
   wherein the word checking software module is configured such that when it is executed by the computer processing device it can perform the following operations:
   (i) selecting one or more language filters including at least one non-English language filter for checking words in an electronic file for the document;
   (ii) using said one or more language filters to check words in said electronic file against corresponding dictionary words by examining said rating in said status field(s);

(iii) generating an alert when said one or more language filters detects a word that has a rating that indicates it is offensive and/or inappropriate for a corresponding audience;

wherein publication of electronic documents can be controlled on an individual electronic document basis so that when disseminated an electronic document only includes words that do not have a rating that indicates that such word is offensive and/or inappropriate for a corresponding audience.

20. The system of claim 19, wherein a rating in all of said status fields for a dictionary word is examined.

21. The system of claim 19 wherein said word checking software indicates which of said one or more language filters has detected a word that has a rating indicating that it is offensive and/or inappropriate for a corresponding audience.

22. The system of claim 19 wherein said rating can be varied to have a value from a scale of 1 to N, and where a higher value indicates a higher level of offensiveness of such word for said corresponding audience.

23. The system of claim 22 wherein a threshold value can be specified for determining when an alert should be generated, based on comparing said rating in said status field to said threshold value.

24. The system of claim 19 wherein an author of said electronic document can control which language filters are used for checking said document.

25. A method of checking the meaning of a word in an electronic document, which electronic document has not been published, the method comprising the steps of:

designating filter words by changing a value of a filter status field for words in one or more electronic dictionaries;

retrieving said word to be checked from an electronic file including said document;

selecting a set of filter words from said one or more electronic dictionaries to be used for checking said word, said set of filter words being based in part on considering an identity of an intended recipient of said electronic document;

determining whether said word has a particular meaning that is (1) designated as offensive in said set of filter words; and/or (2) is designated as potentially inappropriate in said set of filter words for communication to said intended recipient;

wherein the electronic document is checked so as to control initial distribution of such electronic document to said intended recipient;

further wherein said set of filter words can be changed for a subsequent electronic document to be distributed to a different intended recipient.

26. The method of claim 25, wherein the filter status field for each of the words can have one of N values, where N >2, and where N designates whether each of said words is offensive or potentially inappropriate.

27. The method of claim 25, wherein said set of filter words can be selected without input from an author of the document.

28. The method of claim 25, wherein an identification of said set of filter words can take place at or about the time said one or more electronic dictionaries are first generated.

29. The method of claim 25, further including a step of generating an alert indicating that such word is offensive and/or potentially inappropriate.

30. The method of claim 27, further including a step of permitting a user to remove said word from said set of filter words.

31. The method of claim 25, further including a step of specifying a threshold value which the filter status field must exceed in order for said word to be identified as belonging to said set of filter words.

32. A method of checking the meaning of a word in an electronic document, which electronic document has not been published the method comprising the steps of:

providing one or more electronic dictionaries, including a first dictionary file to be used for electronic documents sent to a first audience, and a second dictionary file to be used for electronic documents sent to a second audience;

retrieving the word to be checked from an electronic file for the document, wherein the word has a first meaning in a first context identified as a first rating in said first dictionary file and a second meaning in a second context identified as a second rating in said second dictionary file;

using a set of filter words from said one or more electronic dictionaries to check said word, said set of filter words being based in part on considering an identity of an intended recipient of said electronic document and such that either or both of said first dictionary file and said second dictionary file are used for said set of filter words;

determining whether said word has a particular meaning that is (1) designated as offensive in said set of filter words; and/or (2) is designated as potentially inappropriate for communication to said intended recipient in either of the first or second contexts by examining said first and second ratings in said set of filter words;

wherein the electronic document is checked so as to control initial distribution of such electronic document to said intended recipient; further wherein said set of filter words are changed for a subsequent electronic document to be distributed to a different intended recipient by changing a value of a status field for words in said electronic dictionaries.

33. The method of claim 32, wherein said first context and said second context are based on word meanings of two different languages.

34. The method of claim 32, wherein said first context and said second context are based on gender distinctions.

35. The method of claim 32, wherein said first context and said second context are based on cultural characteristics of two different groups.

36. A method of permitting an author of an electronic document to simultaneously check both the spelling and meaning of words in such document comprising the steps of:

(a) retrieving a word to be spell checked and word checked from an electronic file for said document; and (b) determining whether said word has been spelled correctly; and (c) when said word has been spelled incorrectly, presenting a first list of alternative words to said user as replacements for said word, and permitting said author to select a first replacement word for said word; and (d) designating those words that have a meaning that is offensive and/or potentially inappropriate by changing a value of a status field for such words in an electronic dictionary, wherein said designation is modifiable by the author;

(e) determining whether the meaning of said word or replacement word has a designation as offensive and/or potentially inappropriate for use in a text document; and (f) when said word has been designated as offensive and/or potentially inappropriate, presenting a second list of alternative words to said author as replacements for said word, and permitting said author to select a second replacement word for said word.

37. The method of claim 36, further including a step (g): permitting said author to select said word, the first replacement word, or the second replacement word.

38. The method of claim 36, further including a step (g): repeating steps and as necessary so that a word is selected that is not designated as potentially inappropriate, or said author is permitted to select a word by manual override.

39. The method of claim 36, wherein those words that have and offensive and/or a potentially inappropriate meaning can be identified initially without input from a user of such electronic dictionary.

40. The method of claim 36, wherein an identification of potentially inappropriate words can take place at or about the time the electronic dictionary is first generated.

41. The method of claim 36, further including a step of generating an alert indicating that such word is potentially inappropriate.

42. A method of permitting an author of an electronic document to simultaneously check both the spelling and meaning of words in such document comprising the steps of:
(a) retrieving a word to be spell checked and word checked from an electronic
(b) determining whether said word has been spelled correctly; and
(c) when said word has been spelled incorrectly, presenting a first list of
(d) designating those words that have a meaning that is offensive and/or the author based on an identity of a recipient of the document;
(e) when said word has been designated as offensive and/or potentially
(f) permitting an author to change the value of a status flag for such word to change said designation.

43. A method of word checking an electronic document generated by a word processing program under control of a user of said program, said method comprising the steps of:
(a) storing word-checking status information for said document, including a table identifying offensive and/or potentially inappropriate words used in an electronic file for said document;
(b) monitoring interaction between said user and said word processing program to identify idle editing periods;
(c) locating offensive and/or potentially inappropriate words in said electronic file for said document during the idle editing periods, and updating the word checking status information in response thereto as needed; and
(d) modifying a word filter electronic dictionary containing said offensive and/or potentially inappropriate words based on input from the user by changing a value of a status field for words in electronic dictionaries, so that the user can control which words in said document are to be identified in said table; and
(e) permitting a user to specify a rating threshold which must be exceeded in order for said word to be identified as offensive and/or potentially inappropriate.

44. A method of automatically word checking an electronic document as it is generated by an author of the electronic document and before such electronic document is published, comprising the steps of:

(a) allowing the author to specify one or more word filter dictionaries to be used for filtering text content of the document by changing a value of a status field for words in the word filter dictionaries, where at least one of said one or more word filter dictionaries is selected based on, an intended audience for the electronic document; and
(b) permitting the author to specify a rating threshold which must be exceeded in order for said text content to be identified as potentially inappropriate;
(c) monitoring data input by the author during a data input period that is intended to be included as a word in said document; and
(d) determining whether the word is offensive and/or potentially inappropriate for use in said document by comparing the word against words contained in said one or more word filter dictionaries; and
(e) when the word is determined to be offensive and/or potentially inappropriate, alerting the author; and
wherein a result of said word checking is communicated to the author while the author is still entering said text content of the document so that the electronic document is checked before it is disseminated to said intended audience and so as to control initial distribution of such electronic document.

45. The method of claim 44, wherein said result is communicated before the author has completed data input during a subsequent data input period intended for a subsequent word to be included in said document.

46. The method of claim 44, wherein when the word is determined to be potentially inappropriate the author is precluded from inputting additional words in said document until corrective action has been taken for such word.

47. The method of claim 44, wherein a check of the spelling of such word is also performed, and wherein the result of this spelling check is communicated to the author while the author is still entering said text content of the document.

48. The method of claim 44, further including a step of generating a list of substitute words in the event such word is misspelled, and if a substitute word is selected in lieu of such word, determining whether said substitute word has a meaning that is offensive and/or potentially inappropriate for use in a text document by comparing said substitute word against words contained in said one or more word filter dictionaries.

49. A method of automatically word checking an electronic document as it is generated by an author and before such electronic document is published to an intended recipient, comprising the steps of:
(a) allowing the author to specify one or more word filter dictionaries to be used for filtering text content of the document by changing a value of a status field for words in said word filter dictionaries, where at least one of said one or more word filter dictionaries is selected based on an intended audience for the electronic document; and
(b) monitoring data input by the author during a data input period that is intended to be included as a word in said document, wherein said word has a first meaning in a first context identified as a first rating in a first dictionary file from said one or more word filter dictionaries, and a second meaning in a second context identified as a second rating in a second dictionary file from said one or more word filter dictionaries; and
(c) determining whether the word is offensive and/or potentially inappropriate for use in said document by comparing the word against: words contained in said one or more word filter dictionaries, including said first dictionary file and said second dictionary file such that said word is analyzed iii both the first and second contexts by examining said first and second ratings; and (d) when the word is determined to be offensive and/or potentially inappropriate, alerting the author; and wherein a result of said word checking is communicated to the author while the author is still entering said text content of the document so that: the electronic document is checked before it is disseminated to the intended recipient and so as to control initial distribution of such electronic document.

50. An electronic system for permitting a user to control which words are allowed in an electronic document before the electronic document is published, said system including:

a system memory for storing a word checking software module;

a processing device for executing the word checking software module;

an electronic dictionary for identifying a set of filter words to be filtered from the electronic documents, said set of filter words including both offensive words and/or potentially inappropriate words, and which potentially inappropriate words are determined by considering an identity of an audience intended to receive the electronic document; and wherein the word checking software module is configured such that it can perform the following operations:

(i) retrieving words to be checked from an electronic file for the document; and (ii) designating said set of filter words by changing a value of a status field for such words in said electronic dictionary and/or by storing said set of filter words as one or more separate electronic dictionaries; and (iii) determining whether said words from the document include any from said set of filter words; and (iv) controlling initial distribution of such electronic document based on steps (i) and (ii).

51. The system of claim 50, wherein the status field for each of the words in said electronic dictionary can have one of N values, where N>2.

52. The system of claim 50, wherein said set of filter words can be identified without input from said user, and said set of filter words includes non-English words.

53. The system of claim 50, wherein an identification of said offensive and/or potentially inappropriate words can take place at or about the time the electronic dictionary is first generated.

54. The system of claim 50, wherein the word checking software module is configured such that it can perform the additional operation of generating an alert indicating that a word in the document is in said set of filter words.

55. The system of claim 50, wherein the word checking software module is configured such that it can perform the additional operation of permitting said user to change the value of a status flag for words in said electronic dictionary.

56. The system of claim 50, wherein the word checking software module is configured such that it can perform the additional operation of verifying the spelling of words.

57. The system of claim 56, wherein the word checking software module is configured such that it can perform the additional operation of generating a list of substitute words in the event any word is misspelled, and if a one of the substitute words is selected in lieu of such word, determining whether the substituted word includes any word from said set of filter words.

58. The system of claim 50, wherein the word checking software module is configured such that it can perform the additional operation of checking a set of electronic files corresponding to a set of documents, and generating a list of words in such documents that are in said set of filter words.

59. The system of claim 50, wherein said words are checked substantially immediate in time after they are input into said document by a user to allow said user to correct or ignore any filter words found in said document.

60. The system of claim 50, wherein the word checking software module is configured such that it can perform the additional operation of specifying a threshold value which the status field must exceed in order for words to be identified as part of said set of filter words.

61. An electronic system for permitting a user to control which words are allowed in an electronic document before the electronic document is published, said system including:

a system memory for storing a word checking software module;

a processing device for executing the word checking software module;

an electronic dictionary for identifying a set of filter words to be filtered from the electronic documents by changing a value of a status field for words in said electronic dictionary, said set of filter words including both offensive words and/or potentially inappropriate words, and which potentially inappropriate words are determined by considering an identity of an audience intended to receive the electronic document, and such that said word has a first meaning in a first context identified as a first rating in a first dictionary file forming part of said electronic dictionary, and a second meaning in a second context identified as a second rating in a second dictionary file forming part of said electronic dictionary; and wherein the word checking software module is configured such that it can perform the following operations:

(i) retrieving words to be checked from an electronic file for the document; and (ii) determining whether said words from the document include any from said set of filter words, including by examining said first and second ratings to determine whether said word has a particular meaning that has been designated as potentially inappropriate for use in either of the first or second contexts; and (iii) controlling initial distribution of such electronic document based on steps (i) and (ii);

(iv) repeating steps (i) through (iii) for a different electronic document using a different set of filter words.

62. A method of checking the meaning of a word m an electronic document comprising the steps of:

(a) retrieving a word to be checked from an electronic file for the document; and (b) determining with a first electronic language filter whether said word has a particular meaning that is likely to be offensive to persons intended to read such document; and (c) determining with a second electronic language filter whether said word is potentially inappropriate for use in communications to said persons, based in part on considering an identity of said persons; and (d) configuring said first and second language filters by setting up said language filters in one or m wherein said first and second language filters can be changed on a document by document basis depending on an intended audience for the document.

63. The method of claim 62, wherein said status fields for each of the words can have one of N values, where N>2.

64. The method of claim 62, further including a step of generating an alert indicating at a word is within said first and/or second electronic language filter.

65. The method of claim 62, further including a step of verifying the spelling of such word.

66. The method of claim 65, further including a step of generating a list of substitute words in the event such word is misspelled, and if a one of the substitute words is selected in lieu of such word, determining whether the substituted word has a meaning that is likely to be offensive.

67. The method of claim 62, wherein said word is checked by said first and second language filters substantially immediate in time after it is input into said document by a user.

68. The method of claim 62, wherein the document is an e-mail message, an electronic spreadsheet, an electronic database, or an electronic word processing document.

69. A method of checking content of an unpublished electronic document comprising the steps of:
  (a) specifying a language filter to be used for inspecting words of an electronic file for the electronic document to determine if it contains potentially inappropriate content by changing a value of a status field for words in electronic dictionaries, said language filter being based in part on an identity of an intended recipient of the electronic document and including at least a set of English words and a separate set of non-English words as part of said potentially inappropriate content; and
  (b) specifying a language sensitivity threshold level to be used when evaluating the electronic document, such that a rating value for each word in the electronic document is compared against said language sensitivity threshold level to determine if such word should be identified as potentially inappropriate; and
  (c) providing an output indicating when said language sensitivity threshold is exceeded based on words in the electronic document so as to control initial distribution of such electronic document to said intended recipient.

70. The method of claim 68, wherein said rating value is specified as a status field value in an electronic dictionary used as part of said language filter.

71. A system for checking content of an unpublished electronic document comprising:
  a computer readable storage structure for storing a word checking software module that can be executed by a computer processing device; and
  a language filter, which language filter is adjustable for each document and which is associated with a set of words that are potentially inappropriate for use with a corresponding recipient of the electronic document; and
  wherein the word checking software module is configured such that when it is executed by the computer processing device it can perform the following operations:
    (i) specifying said language filter for checking the electronic document;
    (ii) specifying a language sensitivity threshold level to be used when evaluating the electronic document;
    (iii) providing an output indicating when said language sensitivity threshold is exceeded based on words in an electronic file for the electronic document so as to control initial distribution of such electronic document to said intended recipient;
  wherein a rating value for each word in the electronic document is compared against said language sensitivity threshold level to determine if such word should be identified as potentially inappropriate.

72. A system for checking content of an unpublished electronic document comprising:
  a computer readable storage structure for storing a word checking software module that can be executed by a computer processing device; and
  a language filter, which language filter is adjustable for each document and which is associated with a set of words that are potentially inappropriate for use with a corresponding recipient of the electronic document; and
  wherein the word checking software module is configured such that when it is executed by the computer processing device it can perform the following operations:
    (i) specifying said language filter for checking the electronic document;
    (ii) specifying a language sensitivity threshold level to be used when evaluating the electronic document;
    (iii) providing an output indicating when said language sensitivity threshold is exceeded based on words in an electronic file for the electronic document so as to control initial distribution of such electronic document to said intended recipient;
  wherein a rating value, for each word in the electronic document is compared against said language sensitivity threshold level to determine if such word should be identified as potentially inappropriate
  wherein said rating value and said language sensitivity threshold level are adjustable;
  wherein said rating value is specified as a status field value in an electronic dictionary used as part of said language filter.

73. A method of controlling distribution of an electronic document to prevent dissemination of embarrassing and/or harmful content in such electronic document, the method comprising the steps of:
  a) identifying offensive words that should not be included in an electronic document: to be distributed to an intended third party recipient; and
  b) identifying potentially inappropriate words that should not be included in an electronic document to be distributed to said intended third party recipient, said potentially inappropriate words being based in part on a consideration of an identity of said intended third party recipient; and
  c) inspecting an electronic file for the document before it is distributed to said intended third party recipient to see if it contains any of said offensive and/or potentially inappropriate words, so that a corrective action can be taken to eliminate said offensive and/or potentially inappropriate words and/or to prevent distribution of the document;
  wherein a status field rating for said offensive words and said potentially inappropriate words are changed by an author of the electronic document as part of an electronic language filter.

74. The method of claim 73, wherein an author of the electronic document also sets a threshold value which must be exceeded by said status field rating in order for a word to be considered as one of said offensive and/or potentially inappropriate words.

75. A method of checking content of an electronic document which has not been published comprising the steps of:

(a) configuring a language filter to be used for inspecting content of the electronic document to determine if it contains potentially inappropriate text, said language filter being configured based in part on an identity of intended recipients of the electronic document; and (b) detecting whether an electronic file for said electronic document includes words specified within said language filter; and (c) generating an output indicating the presence of any words detected during step (b) so that the electronic document is checked before it is disseminated to said intended recipients and so as to control initial publication of such electronic document;

wherein said language filter can be adjusted during step (a) as needed according to said identity of said intended recipients, and is configured by setting status field values for words within said electronic file and/or by setting a threshold level of sensitivity to be used when considering words within said electronic document.

76. The method of claim 75, further including a step of setting up said language filter by specifying a first language filter intended for a first audience for the electronic document, and a second language filter intended for a second audience for the electronic document, each of said first and second language filters containing words that are potentially inappropriate for use with said first and second audiences respectively.

77. A system for checking content of an electronic document, which electronic document has not been published, the system including:

a computer readable storage structure for storing a word checking software module that can be executed by a computer processing device;

a configurable language filter, which language filter contains words to be used for checking the content of the electronic document;

wherein the word checking software module is configured such that when it is executed by the computer processing device it can perform the following operations:
  (i) configuring said configurable language filter based in part on an identity of an intended recipient of the electronic document;
    wherein said configurable language filter includes a first language filter and a second language filter as part of an electronic dictionary file, and said first language filter is identified by a first value specified in a first status field in said electronic dictionary file, and said second language filter is identified by a second value specified in a second status field in said electronic dictionary file;
  (ii) using said configurable language filter to check words used in an electronic file for the document;
  (iii) generating an alert when said configurable language filter is triggered;

wherein initial dissemination of the electronic document can be controlled based on whether the content is appropriate for an intended audience of such electronic document.

78. A system for checking content of an electronic document, which electronic document has not been published, the system including:

a computer readable storage structure for storing a word checking software module that can be executed by a computer processing device;

a configurable language filter, which language filter contains words to be used for checking the content of the electronic document;

wherein the word checking software module is configured such that when it is executed by the computer processing device it can perform the following operations:
  (i) configuring said configurable language filter based in part on an identity of an intended recipient of the electronic document by changing a value of a language filter status field for words in an electronic dictionary file;
    wherein said configurable language filter includes a first language filter and a second language filter as part: of an electronic dictionary file, and said first language filter is identified by a first value specified in a first status field in said electronic dictionary file, and said second language filter is identified by a second value specified in a second status field in said electronic dictionary file;
  (ii) using said configurable language filter to check words used in an electronic file for the document;
  (iii) generating an alert when said configurable language filter is triggered;

wherein initial dissemination of the electronic document can be controlled based on whether the content is appropriate for an intended audience of such electronic document.

79. A system for checking content of an electronic document including:

a computer readable storage structure for storing a word checking software module that can be executed by a computer processing device;

a language filter consisting of a first language filter and a second language filter, said first language filter being associated with words that are potentially inappropriate for use in connection with a first group of persons, and said second language filter being associated with words that are potentially inappropriate for use in connection with a second group of persons;

wherein said first language filter and second language filter are part of an electronic dictionary file, and said first language filter is identified by a first set of words in said electronic dictionary file, and said second language filter is identified by a second set of words in said electronic dictionary file;

wherein the word checking software module is configured such that when it is executed by the computer processing device it can perform the following operations:
  (i) selecting either or both of said first and second language filters for checking words in the document based in part on an identity of an intended recipient of the electronic document;
  (ii) using either or both of said first and/or second language filters to check words used in an electronic file for the document;
  (iii) generating an indicator when either or both of said first and/or second language filters is triggered;

wherein dissemination of the electronic document can be controlled based on whether words contained therein are appropriate for an intended audience.

80. A system for checking content of an electronic document including:

a computer readable storage structure for storing a word checking software module that can be executed by a computer processing device;

a language filter consisting of a first language filter and a second language filter, said first language filter being associated with words that are potentially inappropriate for use in connection with a first group of persons, and said second language filter being associated with words that are potentially inappropriate for use in connection with a second group of persons;

wherein said first language filter and second language filter are part of an electronic dictionary file, and said first language filter is identified by a first set of words in said electronic dictionary file, and said second language filter is identified by a second set of words in said electronic dictionary file;

wherein the word checking software module is configured such that when it is executed by the computer processing device it can perform the following operations:

(i) selecting either or both of said first and second language filters for checking words in the document based in part on an identity of an intended recipient of the electronic document by changing a value of status fields for words in said first and second language filters in said electronic dictionary file;

(ii) using either or both of said first arid/or second language filters to check words used in an electronic file for the document;

(iii) generating an indicator when either or both of said first and/or second language filters is triggered;

wherein dissemination of the electronic document can be controlled based on whether words contained therein are appropriate for an intended audience.

81. A method of checking content of electronic documents comprising the steps of:

(a) retrieving a word from an electronic file for a first electronic document; and (b) inspecting said word with a language filter selected for the first electronic document, said language filter consisting of either or both of a first language filter and/or a second language filter, said first language filter being associated with words that are potentially inappropriate for use in connection with a first group of persons, and said second language filter being associated with words that are potentially inappropriate for use in connection with a second group of persons; and (c) identifying whether said word falls within said first language filter and/or said second language filter; and (d) repeating steps (a) through (c) for said first electronic document until all words in said electronic file for said first electronic document are inspected; and (e) repeating steps (a) through (d) for a second electronic document, wherein a language filter selected for the second electronic document can be varied from that used for said first electronic document;

wherein said first language filter and second language filter are part of an electronic dictionary file, and said first language filter is identified by a first set of words in said electronic dictionary file, and said second language filter is identified by a second set of words in said electronic dictionary file.

82. A method of checking content of electronic documents comprising the steps of:

(a) retrieving a word from an electronic file for a first electronic document; and (b) inspecting said word with a language filter selected for the first electronic document, said language filter consisting of either or both of a first language filter and/or a second language filter, said first language filter being associated with words that are potentially inappropriate for use in connection with a first group of persons, and said second language filter being associated with words that are potentially inappropriate for use in connection with a second group of persons; and (c) identifying whether said word falls within said first language filter and/or said second language filter by changing a value of status fields for words in said first and second language filters, based in part on an identity of the first and/or second group of persons; and (d) repeating steps (a) through (c) for said first electronic document until all words in said electronic file for said first electronic document are inspected; and (e) repeating steps (a) through (d) for a second electronic document, wherein a language filter selected for the second electronic document can be varied from that used for said first electronic document;

wherein said first language filter and second language filter are part of an electronic dictionary file, and said first language filter is identified by a first in said electronic dictionary file, and said second language filter is identified by a second set of words in said electronic dictionary file.

83. A system for checking content of electronic documents including:

a computer readable storage structure for storing a word checking software module that can be executed by a computer processing device;

a language filter comprised of a first language filter and a second language filter, said first language filter being associated with words that are potentially inappropriate for use in connection with a first group of persons, and said second language filter being associated with words that are potentially inappropriate for use in connection with a second group of persons;

wherein the word checking software module is configured such that when it is executed by the computer processing device it can perform the following operations:

(i) selecting either or both of said first and second language filters as said language filter for checking content of electronic files containing data for said electronic documents such that said first language filter can be used when said electronic document is a first type of document to be disseminated to said first group of persons, while said second language filter can be used when said electronic document is a second type of document to be disseminated to said second group of persons;

(ii) using said language filter to check words used in said electronic files containing data for said electronic documents;

(iii) generating an alert when said language filter is triggered;

wherein dissemination of said electronic documents, including both said first type of documents and said second type of documents, can be controlled based on whether the content therein is appropriate for an intended audience, including said first and second groups of persons;

and further wherein said first language filter and second language filter are part of an electronic dictionary file, and said first language filter is identified by a first value specified in a first status field in said electronic dictionary file, and said second language filter is identified by a second value specified in a second status field in said electronic dictionary file.

84. A system for checking content of electronic documents including:

a computer readable storage structure for storing a word checking software module that can be executed by a computer processing device;

a language filter comprised of a first language filter and a second language filter, said first language filter being associated with words that are potentially inappropriate for use in connection with a first group of persons, arid said second language filter being associated with words that are potentially inappropriate for use in connection with a second group of persons;

wherein the word checking software module is configured such that when it is executed by the computer processing device it can perform the following operations:
(i) selecting either or both of said first and second language filters as said language filter for checking content of electronic files containing data for said electronic documents such that said first language filter can be used when said electronic document is a first type of document to be disseminated to said first group of persons, while said second language filter can be used when said electronic document is a second type of document to be disseminated to said second group of persons;
(ii) using said language filter to check words used in said electronic files containing data for said electronic documents;
(iii) generating an alert when said language filter is triggered;

wherein dissemination of said electronic documents, including both said first type of documents and said second type of documents, can be controlled based on whether the content therein is appropriate for an intended audience, including said first and second groups of persons;

and further wherein said first language filter and second language filter are part of an electronic dictionary file, and said first language filter is identified by changing a first value specified in a first status field in said electronic dictionary file, and said second language filter is identified by changing a second value specified in a second status field in said electronic dictionary file based on an identity of the first and second group of persons.

85. The system of claim 83, wherein said first language filter contains words that are offensive, and said second language filter contains words that are likely to cause harm and/or embarrassment by their inclusion in the document.

* * * * *

UNITED STATES PATENT AND TRADEMARK OFFICE
CERTIFICATE OF CORRECTION

PATENT NO. : 6,782,510 B1
DATED : August 24, 2004
INVENTOR(S) : Gross et al.

It is certified that error appears in the above-identified patent and that said Letters Patent is hereby corrected as shown below:

Column 7,
Line 14, "4spell" should be -- spell --

Column 12,
Lines 44-45, "inadveriently" should be -- inadvertently --
Line 50, "poten" should be -- potentially inappropriate; and --

Column 17,
Line 27, "electronic" should be -- electronic file for said document; and --
Line 31, "a first list of" should be -- a first list of alternative words to said user as replacements for said word --

Column 19,
Line 1, "against:" should be -- against --
Line 4, "iii" should be -- in --
Line 10, "that:" should be -- that --

Column 20,
Line 53, "m an" should be -- in an --

Column 21,
Line 43, "68" should be -- 69 --

Column 22,
Line 42, "document:" should be -- document --

Column 23,
Line 67, "document:" should be -- document --

Column 25,
Line 19, "arid/or second" should be -- and/or second

Column 27,
Line 5, "arid" should be -- and --

UNITED STATES PATENT AND TRADEMARK OFFICE
CERTIFICATE OF CORRECTION

PATENT NO. : 6,782,510 B1
DATED : August 24, 2004
INVENTOR(S) : Gross et al.

It is certified that error appears in the above-identified patent and that said Letters Patent is hereby corrected as shown below:

Column 28,
Line 19, "83" should be -- 84 --

Signed and Sealed this

Tenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,782,510 B1 Page 1 of 1
APPLICATION NO. : 09/014414
DATED : August 24, 2004
INVENTOR(S) : Gross et al.

It is certified that error appears in the above-identified patent and that said Letters Patent is hereby corrected as shown below:

Claim 19, COLUMN 14, LINE 64+: replace " least one non-English language filter for checking"
with -- least one non-English language filter by changing a value of said one or more status fields for said electronic dictionary words for checking --

Claim 18, COLUMN 14, LINE 13 – 47: delete all text (cancel claims)

Claim 71, COLUMN 21, LINE 45 – COLUMN 22, LINE 4: delete all text (cancel claim)

Claim 77, COLUMN 23, LINE 27 – LINE 58: delete all text (cancel claim)

Claim 79, COLUMN 24, LINE 25 – LINE 58: delete all text (cancel claim)

Claim 81, COLUMN 25, LINE 28 – LINE 55: delete all text (cancel claim)

Claim 83, COLUMN 26, LINE 20 – LINE 62: delete all text (cancel claim)

Claim 50, COLUMN 49, LINE 41: "step (i) and (ii)" should be -- steps (i) – (iii) --

Signed and Sealed this

Twenty-second Day of August, 2006

JON W. DUDAS
*Director of the United States Patent and Trademark Office*

(12) EX PARTE REEXAMINATION CERTIFICATE (9987th)
United States Patent
Gross et al.

(10) Number: US 6,782,510 C1
(45) Certificate Issued: Dec. 17, 2013

(54) WORD CHECKING TOOL FOR CONTROLLING THE LANGUAGE CONTENT IN DOCUMENTS USING DICTIONARIES WITH MODIFYABLE STATUS FIELDS

(75) Inventors: John N. Gross, Woodside, CA (US); Anthony A. Gross, San Jose, CA (US)

(73) Assignee: Wordcheck Tech, LLC, Zephyr Cove, NV (US)

Reexamination Request:
No. 90/012,393, Aug. 1, 2012

Reexamination Certificate for:
Patent No.: 6,782,510
Issued: Aug. 24, 2004
Appl. No.: 09/014,414
Filed: Jan. 27, 1998

Certificate of Correction issued May 10, 2005
Certificate of Correction issued Aug. 22, 2006

(51) Int. Cl.
*G06F 17/27* (2006.01)

(52) U.S. Cl.
CPC ............ *G06F 17/274* (2013.01); *G06F 17/275* (2013.01)
USPC .................................. 715/257; 704/10; 704/9

(58) Field of Classification Search
None
See application file for complete search history.

(56) References Cited

To view the complete listing of prior art documents cited during the proceeding for Reexamination Control Number 90/012,393, please refer to the USPTO's public Patent Application Information Retrieval (PAIR) system under the Display References tab.

*Primary Examiner* — Dennis Bonshock

(57) ABSTRACT

A word processing tool is disclosed for checking the substance and not merely the spelling of words provided by a user. The word checker is capable of identifying potentially inappropriate word choices so that unintentional errors are not introduced into electronic text documents. The word checker can be implemented as a stand-alone procedure, or integrated into a conventional spell-checking program.

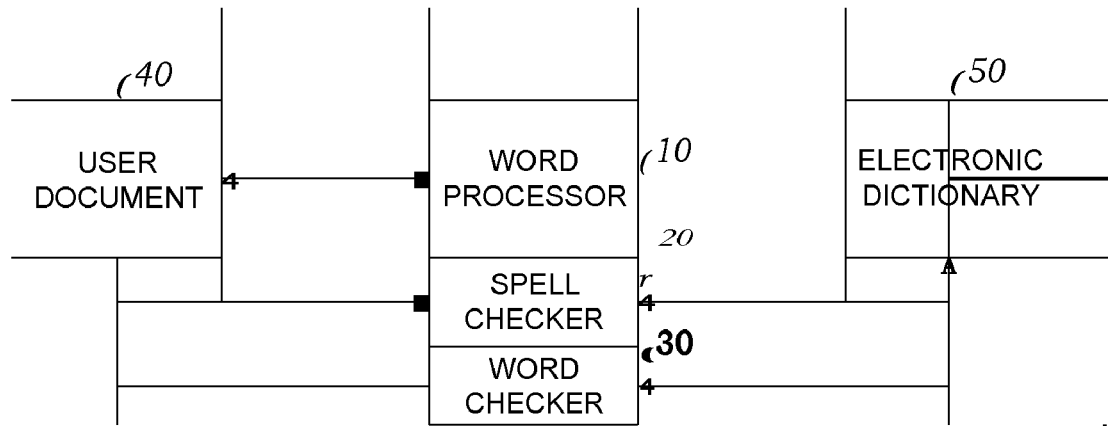

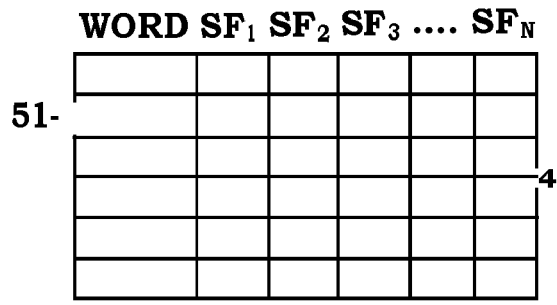

US 6,782,510 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 6, 19, 50, 55, 60, 61 and 72 is confirmed.

Claims 18, 71, 77, 79 and 81 were previously cancelled.

Claims 7, 15, 25, 32, 36, 42, 43, 44, 49, 62, 64, 69, 73, 75, 78, 80, 82 and 84 are determined to be patentable as amended.

Claim 76, dependent on an amended claim, is determined to be patentable.

New claims 86-183 are added and determined to be patentable.

Claims 2-5, 8-14, 16-17, 20-24, 26-31, 33-35, 37-41, 45-48, 51-54, 56-59, 63, 65-68, 70, 74, 83 and 85 were not reexamined.

7. A system for permitting a user to check the meaning of words in an electronic document, said system including:
   a computer readable storage structure for storing a word checking software module, such module being incorporated as part of a word processing program that can be executed by a computer processing device;
   wherein the word checking software module is configured such that when it is executed by the computer processing device it can perform the following operations:
      (i) retrieving said words to be checked from an electronic file for the electronic [docum] *document in response to a user request to check the meaning of all words contained in the electronic document and then determine a rating value of each of said retrieved words;* and
      (ii) determining whether any particular word is inadvertently included and has a particular meaning that has been designated as potentially inappropriate use in said document, based on the identity of an intended recipient; and
      (iii) alerting a user to the presence of said particular word when it is designated as potentially inappropriate; and
      (iv) allowing a user to modify said particular word in said document when it is designated as potentially inappropriate before transmitting said document to a third party; and
      (v) allowing a user of said word checking software module to specify a threshold level of sensitivity to be used in determining whether a word in the electronic document is potentially inappropriate;
   further including an electronic dictionary for storing said words, and wherein said word checking software module designates words that have a meaning that is potentially inappropriate by changing [said] *a* rating value in a status field for such words and/or by storing potentially inappropriate words in one or more separate dictionaries.

15. A method of controlling language content of an electronic document *with a computing system*, the method comprising the steps of:
   (a) defining a word as offensive by specifying a first rating value for a first status field associated with said word in an electronic dictionary; and
   (b) defining a word as potentially inappropriate for communication with an intended recipient of the electronic document by specifying a second rating value for a second status field associated with said word in said electronic dictionary, said second rating value being based in part on a consideration of a gender, language use and/or ethnicity of said particular recipient; and
   (c) entering language content for the electronic document to generate an electronic file including a plurality of text words associated with the electronic document; and
   (d) selecting whether said first status field and/or said second status field in said electronic dictionary should be used for examining said plurality of text words; and
   wherein said selection can be varied for the electronic document depending on an identity of said particular recipient;
   (e) reviewing each text word from said plurality of text words in said electronic file *with the computing system* in accordance with step (d) to determine if any context restricted words are contained in the electronic document, said context restricted words including text words that are offensive and/or potentially inappropriate as defined in steps (a) and (b); and
   (f) identifying any context restricted words in the electronic document *with the computing system* before said electronic file is transmitted to said intended recipient so that said context restricted words can be modified or eliminated.

25. A method of checking the meaning of a word in an electronic document *with the computing system*, which electronic document has not been published, the method comprising the steps of:
   designating filter words by changing a value of a filter status field for words in one or more electronic dictionaries;
   retrieving said word to be checked from an electronic file including said document *with the computing system*;
   selecting a set of filter words from said one or more electronic dictionaries to be used for checking said word, said set of filter words being based in part on considering an identity of an intended recipient of said electronic document;
   determining *with the computing system* whether said word has a particular meaning that is (1) designated as offensive in said set of filter words; and/or (2) is designated as potentially inappropriate in said set of filter words for communication to said intended recipient;
   wherein the electronic document is checked *with the computing system* so as to control initial distribution of such electronic document to said intended recipient;
   further wherein said set of filter words can be changed for a subsequent electronic document to be distributed to a different intended recipient.

32. A method of checking the meaning of a word in an electronic document *with the computing system*, which electronic document has not been published the method comprising the steps of:
   providing one or more electronic dictionaries, including a first dictionary file to be used for electronic documents sent to a first audience, and a second dictionary file to be used for electronic documents sent to a second audience;

retrieving the word to be checked from an electronic file for the document *with the computing system*, wherein the word has a first meaning in a first context identified as a first rating in said first dictionary file and a second meaning in a second context identified as a second rating in said second dictionary file;

using a set of filter words from said one or more electronic dictionaries to check said word *with the computing system*, said set of filter words being based in part on considering an identity of an intended recipient of said electronic document and such that either or both of said first dictionary file and said second dictionary file are used for said set of filter words;

determining *with the computing system* whether said word has a particular meaning that is (1) designated as offensive in said set of filter words; and/or (2) is designated as potentially inappropriate for communication to said intended recipient in either of the first or second contexts by examining said first and second ratings in said set of filter words;

wherein the electronic document is checked *with the computing system* so as to control initial distribution of such electronic document to said intended recipient;

further wherein said set of filter words are changed for a subsequent electronic document to be distributed to a different intended recipient by changing a value of a status field for words in said electronic dictionaries.

36. A method of permitting an author of an electronic document to simultaneously check both the spelling and meaning of words in such document *with a computing system* comprising the steps of:
    (a) retrieving a word to be spell checked and word checked from an electronic file for said document *with the computing system*; and
    (b) determining *with the computing system* whether said word has been spelled correctly; and
    (c) when said word has been spelled incorrectly, presenting a first list of alternative words *with the computing system* to said user as replacements for said word, and permitting said author to select a first replacement word for said word; and
    (d) designating those words that have a meaning that is offensive and/or potentially inappropriate by changing a value of a status field for such words in an electronic dictionary, wherein said designation is modifiable by the author;
    (e) determining *with the computing system* whether the meaning of said word or replacement word has a designation as offensive and/or potentially inappropriate for use in a text document; and
    (f) when said word has been designated as offensive and/or potentially inappropriate, presenting a second list of alternative words *with the computing system* to said author as replacements for said word, and permitting said author to select a second replacement word for said word.

42. A method of permitting an author of an electronic document to simultaneously check both the spelling and meaning of words in such document *with a computing system* comprising the steps of:
    (a) retrieving a word to be spell checked and word checked from an electronic file for said document *with the computing system*; and
    (b) determining *with the computing system* whether said word has been spelled correctly; and
    (c) when said word has been spelled incorrectly, presenting a first list of alternative words *with the computing system* to said user as replacements for said word;
    (d) designating those words that have a meaning that is offensive and/or the author based on an identity of a recipient of the document;
    (e) when said word has been designated as offensive and/or potentially *inappropriate, presenting a second list of alternative words with the computing system to said author as replacements for said word, and permitting said author to select a second replacement word for said word*;
    (f) permitting an author to change the value of a status flag for such word to change said designation.

43. A method of word checking an electronic document generated by a word processing program under control of a user of said program, said method comprising the steps of:
    (a) storing word-checking status information for said document *with a computing system*, including a table identifying offensive and/or potentially inappropriate words used in an electronic file for said document;
    (b) monitoring interaction between said user and said word processing program *with the computing system* to identify idle editing periods;
    (c) locating offensive and/or potentially inappropriate words in said electronic file for said document *with the computing system* during the idle editing periods, and updating the word checking status information in response thereto as needed; and
    (d) modifying a word filter electronic dictionary containing said offensive and/or potentially inappropriate words based on input from the user by changing a value of a status field for words in electronic dictionaries, so that the user can control which words in said document are to be identified in said table; and
    (e) permitting a user to specify a rating threshold which must be exceeded in order for said word to be identified as offensive and/or potentially inappropriate *by the computing system*.

44. A method of automatically word checking an electronic document *with a computing system* as it is generated by an author of the electronic document and before such electronic document is published, comprising the steps of:
    (a) allowing the author to specify one or more word filter dictionaries to be used *by the computing system* for filtering text content of the document by changing a value of a status field for words in the word filter dictionaries, where at least one of said one or more word filter dictionaries is selected based on, an intended audience for the electronic document; and
    (b) permitting the author to specify a rating threshold which must be exceeded in order for said text content to be identified *by the computing system* as potentially inappropriate;
    (c) monitoring data input by the author *with the computing system* during a data input period that is intended to be included as a word in said document; and
    (d) determining *with the computing system* whether the word is offensive and/or potentially inappropriate for use in said document by comparing the word against words contained in said one or more word filter dictionaries; and
    (e) when the word is determined to be offensive and/or potentially inappropriate, alerting the author *with the computing system*; and
    wherein a result of said word checking is communicated to the author *with the computing system* while the author is 49. A method of automatically word checking an electronic document *with a computing system* as it is generated by an author and before such electronic document is published to an intended recipient, comprising the steps of:

(a) allowing the author to specify one or more word filter dictionaries to be used *by the computing system* for filtering text content of the document by changing a value of a status field for words in said word filter dictionaries, where at least one of said one or more word filter dictionaries is selected based on an intended audience for the electronic document; and (b) monitoring data input by the author *with the computing system* during a data input period that is intended to be included as a word in said document, wherein said word has a first meaning in a first context identified as a first rating in a first dictionary file from said one or more word filter dictionaries, and a second meaning in a second context identified as a second rating in a second dictionary file from said one or more word filter dictionaries; and (c) determining *with the computing system* whether the word is offensive and/or potentially inappropriate for use in said document by comparing the word against words contained in said one or more word filter dictionaries, including said first dictionary file and said second dictionary file such that said word is analyzed in both the first and second contexts by examining said first and second ratings; and (d) when the word is determined to be offensive and/or potentially inappropriate, alerting the author *with the computing system*; and wherein a result of said word checking is communicated to the author *with the computing system* while the author is still entering said text content of the document so that the electronic document is checked before it is disseminated to the intended recipient and so as to control initial distribution of such electronic document.

62. A method of checking the meaning of [a word in an electronic document] *words in a plurality of electronic documents with a computing system* comprising the steps of:

(a) retrieving a word to be checked from an electronic file for [the] *a first* document *with the computing system*; and (b) determining with a first electronic language filter *and the computing system* whether said word has a particular meaning that is likely to be offensive to persons intended to read such *first* document; and (c) determining with a second electronic language filter *and the computing system* whether said word is potentially inappropriate for use in communications to said persons *in the first document*, based in part on considering an identity of said persons; and (d) configuring said first and second language filters by setting up said language filters [in one or m] *through a setting of a value of one or more status fields for such words in an electronic dictionary;*

(e) *repeating steps (a) through (d) for a second separate electronic document:* wherein said first and second language filters [can be] *are* changed on a document by document basis *for said first electronic document and said second electronic document* depending on an intended audience for [the document] *such documents*.

64. The method of claim 62, further including a step of generating an alert indicating [at] *that* a word is within said first and/or second electronic language filter.

69. A method of checking content of an unpublished electronic document *with the computing system* comprising the steps of:

(a) specifying a language filter to be used *by the computing system* for inspecting words of an electronic file for the electronic document to determine if it contains potentially inappropriate content by changing a value of a status field for words in electronic dictionaries, said language filter being based in part on an identity of an intended recipient of the electronic document and including at least a set of English words and a separate set of non-English words as part of said potentially inappropriate content; and (b) specifying a language sensitivity threshold level to be used when evaluating the electronic document, such that a rating value for each word in the electronic document is compared against said language sensitivity threshold level *by the computing system* to determine if such word should be identified as potentially inappropriate; and (c) providing an output indicating *with the computing system* when said language sensitivity threshold is exceeded based on words in the electronic document so as to control initial distribution of such electronic document to said intended recipient.

73. A method of controlling distribution of an electronic document *with a computing system* to prevent dissemination of embarrassing and/or harmful content in such electronic document, the method comprising the steps of:

a) identifying offensive words that should not be included in an electronic document to be distributed to an intended third party recipient; and b) identifying potentially inappropriate words that should not be included in an electronic document to be distributed to said intended third party recipient, said potentially inappropriate words being based in part on a consideration of an identity of said intended third party recipient; and c) inspecting an electronic file for the document *with the computing system* before it is distributed to said intended third party recipient to see if it contains any of said offensive and/or potentially inappropriate words, so that a corrective action can be taken to eliminate said offensive and/or potentially inappropriate words and/or to prevent distribution of the document;

wherein a status field rating for said offensive words and said potentially inappropriate words are changed by an author of the electronic document *at steps (a) and (b)* as part of an electronic language filter *used by the computing system during step (c)*.

75. A method of checking content of an electronic document which has not been published *with a computing system* comprising the steps of:

(a) configuring a language filter to be used for inspecting content of the electronic document to determine if it contains potentially inappropriate text, said language filter *including a plurality of electronic dictionaries and* being configured based in part on an identity of intended recipients of the electronic document; and (b) detecting *with the computing system* whether an electronic file for said electronic document includes words specified within said language filter; and (c) generating an output *with the computing system* indicating the presence of any words detected during step (b) so that the electronic document is checked before it is disseminated to said intended recipients and so as to control initial publication of such electronic document;

(d) *generating an alert including a visual highlight of any inappropriate text found in the electronic file;* wherein said language filter can be adjusted during step (a) as needed according to said identity of said intended recipients, and is configured by setting status field values for words within said electronic file and/or by setting a threshold level of sensitivity to be used when considering words within said electronic document.

78. A system for checking content of an electronic document, which electronic document has not been published, the system including:

a computer readable storage structure for storing a word checking software module that can be executed by a computer processing device;

a configurable language filter, which language filter contains words to be used for checking the content of the electronic document;

wherein the word checking software module is configured such that when it is executed by the computer processing device it can perform the following operations:

(i) configuring said configurable language filter based in part on an identity of an intended recipient of the electronic document by changing a value of a language filter status field for words in an electronic dictionary file;

wherein said configurable language filter includes a first language filter and a second language filter as part of an electronic dictionary file, and said first language filter is identified by a first value specified in a first status field in said electronic dictionary file, and said second language filter is identified by a second value specified in a second status field in said electronic dictionary file;

*wherein a selection of which of said first language filter and/or said second language filter is used to check data for said electronic documents is determined by identifying intended recipient(s) of said electronic documents;*

(ii) using said configurable language filter to check words used in an electronic file for the document;

(iii) generating an alert when said configurable language filter is triggered, *said alert including a visual highlight of any words found in said configurable language filter for operation (ii);* wherein initial dissemination of the electronic document can be controlled *by the system* based on whether the content is appropriate for an intended audience of such electronic document.

80. A system for checking content of an electronic document including:

a computer readable storage structure for storing a word checking software module that can be executed by a computer processing device;

a language filter consisting of a first language filter and a second language filter, said first language filter being associated with words that are potentially inappropriate for use in connection with a first group of persons, and said second language filter being associated with words that are potentially inappropriate for use in connection with a second group of persons;

wherein said first language filter and second language filter are part of an electronic dictionary file, and said first language filter is identified by a first set of words in said electronic dictionary file, and said second language filter is identified by a second set of words in said electronic dictionary file;

wherein the word checking software module is configured such that when it is executed by the computer processing device it can perform the following operations:

(i) selecting either or both of said first and second language filters for checking words in the document based in part on an identity of an intended recipient of the electronic document by changing a value of status fields for words in said first and second language filters in said electronic dictionary file;

(ii) using either or both of said first and/or second language filters to check words used in an electronic file for the document;

*wherein a selection of which of said first set of words and/or said second set of words is used to check words is determined by identifying intended recipient(s) of the electronic document;*

(iii) generating an indicator when either or both of said first and/or second language filters is triggered;

wherein dissemination of the electronic document can be controlled based on whether words contained therein are appropriate for an intended audience.

82. A method of checking content of electronic documents *with a computing system* comprising the steps of:

(a) retrieving a word from an electronic file for a first electronic document *with the computing system*; and (b) inspecting said word with *the computing system using* a language filter selected for the first electronic document, said language filter consisting of either or both of a first language filter and/or a second language filter, said first language filter being associated with words that are potentially inappropriate for use in connection with a first group of persons, and said second language filter being associated with words that are potentially inappropriate for use in connection with a second group of persons; and (c) identifying whether said word falls within said first language filter and/or said second language filter by changing a value of status fields for words in said first and second language filters, based in part on an identity of the first and/or second group of persons; and (d) repeating steps (a) through (c) for said first electronic document *with the computing system* until all words in said electronic file for said first electronic document are inspected; and (e) repeating steps (a) through (d) for a second electronic document *with the computing system*, wherein a language filter selected for the second electronic document can be varied from that used for said first electronic document;

wherein said first language filter and second language filter are part of an electronic dictionary file, and said first language filter is identified by a first *set of words* in said electronic dictionary file, and said second language filter is identified by a second set of words in said electronic dictionary file.

84. A system for checking content of electronic documents including:

a computer readable storage structure for storing a word checking software module that can be executed by a computer processing device;

a language filter comprised of a first language filter and a second language filter, said first language filter being associated with words that are potentially inappropriate for use in connection with a first group of persons, and said second language filter being associated with words that are potentially inappropriate for use in connection with a second group of persons;

wherein the word checking software module is configured such that when it is executed by the computer processing device it can perform the following operations:
  (i) selecting either or both of said first and second language filters as said language filter for checking content of electronic files containing data for said electronic documents such that said first language filter can be used when said electronic document is a first type of document to be disseminated to said first group of persons, while said second language filter can be used when said electronic document is a second type of document to be disseminated to said second group of persons;
  (ii) using said language filter to check words used in said electronic files containing data for said electronic documents;
  wherein a selection of which of said first language filter and/or said second language filter is used to check data for said electronic documents is determined by identifying intended recipient(s) of said electronic documents;
  (iii) generating an alert when said language filter is triggered;
  wherein dissemination of said electronic documents, including both said first type of documents and said second type of documents, can be controlled based on whether the content therein is appropriate for an intended audience, including said first and second groups of persons;
  and further wherein said first language filter and second language filter are part of an electronic dictionary file, and said first language filter is identified by changing a first value specified in a first status field in said electronic dictionary file, and said second language filter is identified by changing a second value specified in a second status field in said electronic dictionary file based on an identity of the first and second group of persons.

86. The article of claim 1 wherein said appropriateness rating for words in said electronic dictionary are derived from surveys and/or polling data obtained from members of said particular audience.

87. The article of claim 1 wherein said appropriateness rating for words in said electronic dictionary are derived from analyses of published literature directed to said particular audience.

88. The article of claim 1 wherein said electronic dictionary includes a grid of entries with words on a first axis and a corresponding audience on a second axis and is configured such that said status field is at an intersection of such axes and contains a ratings value identified for such word with a particular audience.

89. The article of claim 1 wherein said word checking routine is configured to process multiple electronic documents at a time in a batch.

90. The article of claim 1 wherein said word checking routine is configured to check said unpublished electronic document for a plurality of different intended audiences prior to disseminating such document to each of said plurality of different intended audiences.

91. The article of claim 1 wherein said word checking routine is configured to generate an alert including a visual highlight of any word determined to exceed said threshold value.

92. The article of claim 1 wherein said word checking routine is configured to identify a filter triggered by one or more checked words.

93. The article of claim 1 wherein said unpublished electronic document includes advertising content.

94. The article of claim 93 wherein said advertising content includes language from more than one ethnic group.

95. The system of claim 7 wherein said word checking software module is configured to process multiple electronic documents at a time in a batch.

96. The system of claim 7 wherein said word checking software module is configured to check said electronic document for a plurality of different intended recipients prior to disseminating such document to each of said plurality of different intended recipients.

97. The system of claim 7 wherein said word checking software module generates a visual highlight of said particular word for operation (iii).

98. The system of claim 7 wherein said word checking software module is further configured to identify a filter triggered by said particular word.

99. The method of 15 wherein said electronic dictionary includes a grid of entries with words on a first axis and a corresponding audience on a second axis and is configured such that status fields are at intersections of such axes and contain ratings values identified for such word with a particular recipient.

100. The method of claim 15 further including a step: processing multiple electronic documents at a time in a batch.

101. The method of claim 15 wherein the electronic document is reviewed at step (e) for a plurality of different intended recipients prior to transmitting such document to each of said plurality of different intended recipients.

102. The method of claim 15 further including a step: generating an alert including a visual highlight of said context restricted words.

103. The method of claim 15 further including a step: identifying a filter triggered by said context restricted words.

104. The system of claim 19 wherein said word checking software module is configured to process multiple electronic documents at a time in a batch.

105. The system of claim 19 wherein said word checking software module is configured to check said electronic document for a plurality of different intended audiences prior to disseminating such document to each of said plurality of different intended audiences.

106. The system of claim 19 wherein said alert includes a visual highlight of said word for operation (iii).

107. The system of claim 19 wherein said word checking software module is further configured to identify which of said one or more language filters was triggered for operation (iii).

108. The method of claim 25 wherein said one or more electronic dictionaries include a separate corresponding dictionary for each of said different intended recipients.

109. The method of claim 108 wherein said one or more electronic dictionaries include a table of rating values identified for a word with a corresponding recipient.

110. The method of claim 25 further including a step: processing multiple electronic documents at a time in a batch.

111. The method of claim 25 wherein the electronic document is checked for a plurality of different intended recipients prior to distributing such document to each of said plurality of different intended recipients.

112. The method of claim 29 further including a step: generating a visual highlight of such word as part of said alert.

113. The method of claim 29 further including a step: identifying a filter associated with said alert.

114. The method of claim 25 wherein the electronic document is not distributed when a word having a rating value in excess of a user defined threshold is present in such document.

115. The method of claim 25 wherein said particular meaning for said word is determined by a rating value in said set of filter words.

116. The method of claim 25 wherein said unpublished electronic document includes advertising content.

117. The article of claim 116 wherein said advertising content includes language from more than one ethnic group.

118. The method of claim 32 further including a step: processing multiple electronic documents at a time in a batch.

119. The method of claim 32 wherein the electronic file is checked for a plurality of different intended recipients prior to distributing such document to each of said plurality of different intended recipients.

120. The method of claim 32 further including a step: generating an alert including a visual highlight of any words found in said set of filter words.

121. The method of claim 32 further including a step: identifying a filter triggered by said word as part of an alert.

122. The method of claim 44 wherein the electronic document is reviewed at step (d) for a plurality of different intended recipients prior to disseminating such document to each of said plurality of different intended recipients.

123. The method of claim 49 wherein the electronic document is reviewed at step (c) for a plurality of different intended recipients prior to distributing such document to each of said plurality of different intended recipients.

124. The system of claim 50 wherein said set of filter words are in an electronic dictionary including a grid of entries with words on a first axis and a corresponding audience on a second axis and which is configured such that said one or more status fields are intersections of such axes and contain a rating value identified for such word with a particular audience.

125. The system of claim 50 wherein said set of filter words are stored in one or more separate electronic dictionaries such that a separate corresponding dictionary is provided and checked for each of said different intended audiences.

126. The system of claim 50 wherein said word checking software module is configured to check said electronic document for a plurality of different intended audiences prior to distributing such document to each of said plurality of different intended recipients.

127. The system of claim 50 wherein said offensive words and potentially inappropriate words are in separate electronic files.

128. The system of claim 54 wherein said alert includes a visual highlight of said word.

129. The system of claim 54 wherein said word checking software module is further configured to identify a language filter triggered by said word.

130. The system of claim 61 wherein said word checking software module is configured to process multiple electronic documents at a time in a batch.

131. The system of claim 61 wherein said word checking software module is configured to check said electronic document for a plurality of different intended audiences prior to distributing such document to each of said plurality of different intended audiences.

132. The system of claim 61 wherein said word checking software module is further configured to generate an alert including a visual highlight of any words found in said set of filter words for operation (ii).

133. The system of claim 61 wherein said word checking software module is further configured to identify a language filter triggered for operation (ii).

134. The method of claim 62 further including a step: processing multiple electronic documents at a time in a batch.

135. The method of claim 62 wherein the electronic document is reviewed at steps (b) and (c) for a plurality of different intended audiences prior to communicating such document to each of said plurality of different intended audiences.

136. The method of claim 62 wherein said unpublished electronic document includes advertising content.

137. The method of claim 136 wherein said advertising content includes language from more than one ethnic group.

138. The method of claim 69 further including a step: processing multiple electronic documents at a time in a batch.

139. The method of claim 69 wherein the electronic document is reviewed at step (e) for a plurality of different intended recipients prior to distributing such document to each of said plurality of different intended recipients.

140. The method of claim 69 further including a step: generating an alert including a visual highlight of words exceeding said language sensitivity threshold.

141. The method of claim 69 further including a step: providing an identity of a filter triggered by any words exceeding said language sensitivity threshold as part of an alert.

142. The method of claim 69 wherein said electronic document includes advertising content.

143. The system of claim 72 wherein said word checking software module is configured to process multiple electronic documents at a time in a batch.

144. The system of claim 72 wherein said word checking software module is configured to check said electronic document for a plurality of different intended recipients prior to distributing such document to each of said plurality of different intended recipients.

145. The system of claim 72 wherein said word checking software module is further configured to generate an alert including a visual highlight of any words found in said language filter for operation (ii).

146. The system of claim 72 wherein said word checking software module is further configured to identify a language filter triggered for operation (iii).

147. The method of claim 73 further including a step: processing multiple electronic documents at a time in a batch.

148. The method of claim 73 wherein the electronic document is reviewed at step (c) for a plurality of different recipients prior to distributing such document to each of said plurality of different recipients.

149. The method of claim 73 further including a step: generating an alert including a visual highlight of any offensive and/or potentially inappropriate words found in the electronic file.

150. The method of claim 73 further including a step: identifying a filter triggered by any offensive and/or potentially inappropriate words found in the electronic file as part of an alert.

151. The method of claim 73 wherein said electronic document includes advertising content.

152. The method of claim 73 wherein said advertising content includes language from more than one ethnic group.

153. The method of claim 75 further including a step: processing multiple electronic documents at a time in a batch.

154. The method of claim 75 wherein the electronic document is reviewed at step (b) for a plurality of different recipients prior to publishing such document to each of said plurality of different recipients.

155. The method of claim 75 further including a step: identifying a filter triggered by any inappropriate text found in the electronic file as part of an alert.

156. The method of claim 75 wherein the electronic document is not published to said intended recipient when a word having a rating value in excess of a user defined threshold is present in such document.

157. The method of claim 156 wherein said user is an author of the electronic document.

158. The method of claim 75 wherein said unpublished electronic document includes advertising content.

159. The method of claim 158 wherein said advertising content includes language from more than one ethnic group.

160. The system of claim 78 wherein said word checking software module is configured to process multiple electronic documents at a time in a batch.

161. The system of claim 78 wherein said word checking software module is configured to check said electronic document for a plurality of different recipients prior to disseminating such document to each of said plurality of different recipients.

162. The system of claim 78 wherein said word checking software module is further configured to identify which of said first language filter and/or said second language filter was triggered for operation (iii).

163. The system of claim 78 wherein said unpublished electronic document includes advertising content.

164. The system of claim 163 wherein said advertising content includes language from more than one ethnic group.

165. The system of claim 80 wherein said electronic dictionary includes a grid of entries with words on a first axis and a corresponding group of persons on a second axis and is configured such that said one or more status fields are intersections of such axes and contain a rating value identified for such word with a particular group of persons.

166. The system of claim 80 wherein said word checking software module is configured to process multiple electronic documents at a time in a batch.

167. The system of claim 80 wherein said word checking software module is configured to check said electronic document for a plurality of different groups of persons prior to disseminating such document to each of said plurality of different groups of persons.

168. The system of claim 80 wherein said indicator includes a visual highlight of any words found in said configurable language filter for operation (iii).

169. The system of claim 80 wherein said word checking software module is further configured to identify which of said first language filter and/or said second language filter was triggered for operation (iii).

170. The method of claim 82 wherein said electronic dictionary filed includes a grid of entries with words on a first axis and a corresponding group of persons on a second axis and is configured such that said one or more status fields are intersections of such axes and contain a rating value identified for such word with a particular group of persons.

171. The method of claim 82 further including a step: processing multiple electronic documents at a time in a batch.

172. The method of claim 82 wherein the first electronic document is reviewed at step (e) for a plurality of different intended groups of persons prior to communicating such document to each of said plurality of different intended groups of persons.

173. The method of claim 82 further including a step: generating an alert including a visual highlight of any words found in the electronic file falling with said first language filter and/or said second language filter.

174. The method of claim 82 further including a step: identifying which of said first language filter and/or second language filter was triggered as part of an alert.

175. The method of claim 82 wherein the first electronic document is not distributed when a word having a rating value in excess of a user defined threshold is present in such document.

176. The method of claim 175 wherein said user is an author of the electronic document.

177. The system of claim 84 wherein said electronic dictionary filed includes a grid of entries with words on a first axis and a corresponding group of persons on a second axis and is configured such that said one or more status fields are intersections of such axes and contain a rating value identified for such word with a particular group of persons.

178. The system of claim 84 wherein said word checking software module is configured to process multiple electronic documents at a time in a batch.

179. The system of claim 84 wherein said word checking software module is configured to check said electronic document for a plurality of different intended groups of persons prior to disseminating such document to each of said plurality of different intended groups of persons.

180. An electronic system for permitting a user to control which words are allowed in an electronic document before the electronic document is published, said system including:
   a system memory for storing a word checking software module;
   a processing device for executing the word checking software module;
   an electronic dictionary for identifying a set of filter words to be filtered from the electronic documents, said set of filter words including both offensive words and potentially inappropriate words, and which potentially inappropriate words are determined by considering an identity of an audience intended to receive the electronic document, including a language spoken by said audience; and
   further wherein the word checking software module is configured such that it can perform the following operations:
   (i) retrieving words to be checked from an electronic file for the document; and
   (ii) designating said set of filter words, including a language to be used for checking the document, by changing a value of a status field for such words in said electronic dictionary and/or by storing said set of filter words as one or more separate electronic dictionaries; wherein each audience identified for the electronic document is associated with a separate set of filter words; and
   (iii) determining whether said words from the document include any from said set of filter words for each identified audience; and
   (iv) controlling initial distribution of such electronic document to each identified audience based on steps (i)-(iii).

181. A method of checking the meaning of a word in an electronic document with the computing system, which electronic document has not been published, the method comprising the steps of:
   designating filter words by changing a value of a filter status field for words in one or more electronic dictionaries;
   retrieving said word to be checked from an electronic file including said document with the computing system;
   selecting a set of filter words from said one or more electronic dictionaries to be used for checking said word, said set of filter words being based in part on considering an identity of an intended recipient of said electronic document;

determining with the computing system whether said word has a particular meaning that is (1) designated as offensive in said set of filter words; and/or (2) is designated as potentially inappropriate in said set of filter words for communication to said intended recipient;

wherein the electronic document is checked with the computing system by retrieving words from such document and then checking to see if they are in said set of filter words so as to control initial distribution of such electronic document to said intended recipient;

further wherein said set of filter words is changed for a subsequent electronic document to be distributed to a different intended recipient based on an identity of said different intended recipient.

182. A method of checking content of an unpublished electronic document with the computing system comprising the steps of:

(a) specifying a language filter to be used by the computing system for inspecting words of an electronic file for the electronic document to determine if it contains potentially inappropriate content by changing a value of a status field for words in electronic dictionaries, said language filter being based in part on an identity of an intended recipient of the electronic document and including at least a set of English words and a separate set of non-English words as part of said potentially inappropriate content; and (b) specifying a language sensitivity threshold level to be used when evaluating the electronic document, such that a rating value for each word identified in the language filter after being extracted from the electronic document is compared against said language sensitivity threshold level by the computing system to determine if such word should be identified as potentially inappropriate; and (c) providing an output indicating with the computing system when said language sensitivity threshold is exceeded based on checking words retrieved from the electronic document against said language filter so as to control initial distribution of such electronic document to said intended recipient.

183. A method of checking content of electronic documents with a computing system comprising the steps of:

(a) retrieving a word from an electronic file for a first electronic document with the computing system; and (b) inspecting said word with the computing system using a language filter of filter words selected for the first electronic document based on identifying a group of persons designated as intended recipients for such document, said language filter consisting of either or both of a first language filter and/or a second language filter, said first language filter being associated with words that are potentially inappropriate for use in connection with a first group of persons, and said second language filter being associated with words that are potentially inappropriate for use in connection with a second group of persons; and (c) identifying whether said word falls within said first language filter and/or said second language filter by changing a value of status fields for words in said first and second language filters, based in part on an identity of the first and/or second group of persons; and (d) repeating steps (a) through (c) for said first electronic document with the computing system until all words in said electronic file for said first electronic document are inspected against said language filter; and (e) repeating steps (a) through (d) for a second electronic document with the computing system, wherein a language filter selected for the second electronic document is varied from that used for said first electronic document;

wherein said first language filter and second language filter are part of an electronic dictionary file, and said first language filter is identified by a first set of words in said electronic dictionary file, and said second language filter is identified by a second set of words in said electronic dictionary file.

\* \* \* \* \*